(12) United States Patent
Moccagatta et al.

(10) Patent No.: US 10,827,186 B2
(45) Date of Patent: Nov. 3, 2020

(54) METHOD AND SYSTEM OF VIDEO CODING WITH CONTEXT DECODING AND RECONSTRUCTION BYPASS

(71) Applicant: Intel Corporation, Santa Clara, CA (US)

(72) Inventors: Iole Moccagatta, San Jose, CA (US); Zhipin Deng, Beijing (CN); Hiu-Fai Chan, Rancho Cordova, CA (US); Lidong Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 15/403,935

(22) Filed: Jan. 11, 2017

(65) Prior Publication Data
US 2018/0063534 A1    Mar. 1, 2018

Related U.S. Application Data

(60) Provisional application No. 62/379,574, filed on Aug. 25, 2016.

(51) Int. Cl.
| | | |
|---|---|---|
| *H04N 19/91* | (2014.01) | |
| *H04N 19/176* | (2014.01) | |
| *H04N 19/463* | (2014.01) | |
| *H04N 19/103* | (2014.01) | |
| *H04N 19/159* | (2014.01) | |
| *H04N 19/172* | (2014.01) | |
| *H04N 19/70* | (2014.01) | |

(52) U.S. Cl.
CPC ......... *H04N 19/176* (2014.11); *H04N 19/103* (2014.11); *H04N 19/159* (2014.11); *H04N 19/172* (2014.11); *H04N 19/463* (2014.11); *H04N 19/70* (2014.11); *H04N 19/91* (2014.11)

(58) Field of Classification Search
CPC .. H04N 19/159; H04N 19/172; H04N 19/176; H04N 19/70
USPC .................................................. 375/240.12
See application file for complete search history.

(56) References Cited

U.S. PATENT DOCUMENTS

| | | | |
|---|---|---|---|
| 6,233,017 B1 | 5/2001 | Chaddha | |
| 10,554,977 B2* | 2/2020 | Fu | H04N 19/13 |
| 2003/0113026 A1 | 6/2003 | Srinivasan et al. | |
| 2004/0190615 A1* | 9/2004 | Abe | H04N 19/56 375/240.15 |
| 2005/0053143 A1* | 3/2005 | Holcomb | H04N 19/70 375/240.16 |
| 2008/0240254 A1* | 10/2008 | Au | G06T 1/20 375/240.24 |
| 2009/0274213 A1* | 11/2009 | Zhou | H04N 19/176 375/240.15 |
| 2012/0082223 A1 | 4/2012 | Karczewicz et al. | |
| 2012/0093226 A1 | 4/2012 | Chien et al. | |
| 2013/0251038 A1* | 9/2013 | Yokoyama | H04N 19/176 375/240.13 |

(Continued)

OTHER PUBLICATIONS

International Search Report and Written Opinion from PCT/US2017/043553.

(Continued)

*Primary Examiner* — James T Boylan
(74) *Attorney, Agent, or Firm* — Green, Howard & Mughal LLP.

(57) ABSTRACT

Techniques related to video coding with context decoding and reconstruction bypass.

24 Claims, 11 Drawing Sheets

(56) References Cited

U.S. PATENT DOCUMENTS

| | | | | |
|---|---|---|---|---|
| 2013/0272377 | A1* | 10/2013 | Karczewicz | H03M 7/30 375/240.02 |
| 2013/0294522 | A1* | 11/2013 | Lim | H04N 19/513 375/240.16 |
| 2014/0093180 | A1* | 4/2014 | Esenlik | H04N 19/70 382/233 |
| 2016/0100191 | A1* | 4/2016 | Mishra | H04N 19/119 375/240.12 |
| 2016/0295237 | A1* | 10/2016 | Piao | H04N 19/593 |
| 2017/0155899 | A1* | 6/2017 | Lin | H04N 19/105 |
| 2017/0289566 | A1* | 10/2017 | He | H04N 19/52 |
| 2017/0324978 | A1* | 11/2017 | Xu | H04N 19/56 |

OTHER PUBLICATIONS

Richardson, I. VCodex White Paper: H.264 / AVC, Context Adaptive Binary Arithmetic Coding, (CABAC), © 2002-2011, 5 pages.
Said, A. "Introduction to Arithmetic Coding—Theory and Practice", Imaging Systems Laboratory, HP Laboratories Palo Alto, HPL-2004-76, Apr. 21, 2004, Published as a chapter in Lossless Compression Handbook by Khalid Sayood, https://www.sciencedirect.com/science/book/9780126208610 67 pages.
International Preliminary Report on Patentability for PCT Application No. PCT/US17/43553, dated Mar. 7, 2019.

\* cited by examiner

OBTAIN A PLURALITY OF FRAMES OF A VIDEO SEQUENCE WHEREIN INDIVIDUAL FRAMES ARE DIVIDED INTO BLOCKS OF PIXEL DATA 302

DETERMINE AT LEAST ONE CURRENT BLOCK TO BE DECODED USING AT LEAST ONE SPATIAL NEIGHBOR BLOCK 304

DETERMINE WHETHER FULLY CONSTRUCTED CONTEXT PROVIDED BY THE AT LEAST ONE SPATIAL NEIGHBOR BLOCK WILL BE AVAILABLE WHEN THE CORRESPONDING CURRENT BLOCK IS READY TO BE DECODED 306

USE ALREADY AVAILABLE CONTEXT DATA OF AT LEAST ONE CONTEXT-READY BLOCK WHEN FULLY CONSTRUCTED CONTEXT OF THE AT LEAST ONE SPATIAL NEIGHBOR BLOCK IS NOT AVAILABLE TO DECODE THE CURRENT BLOCK 308

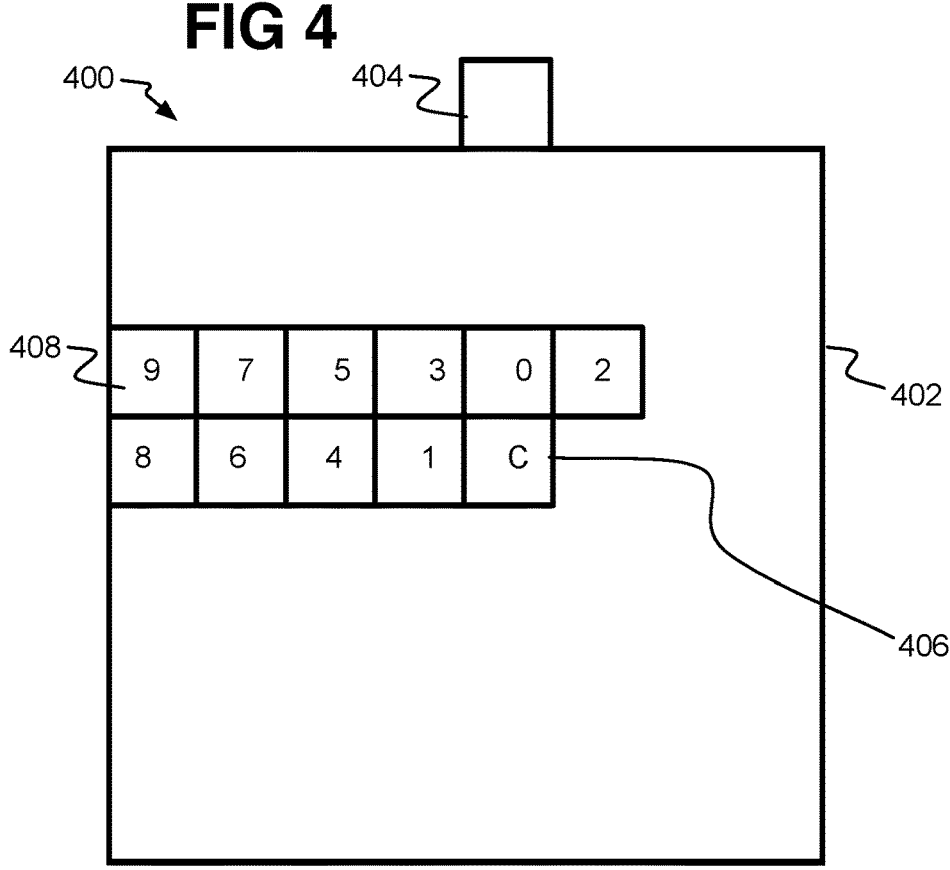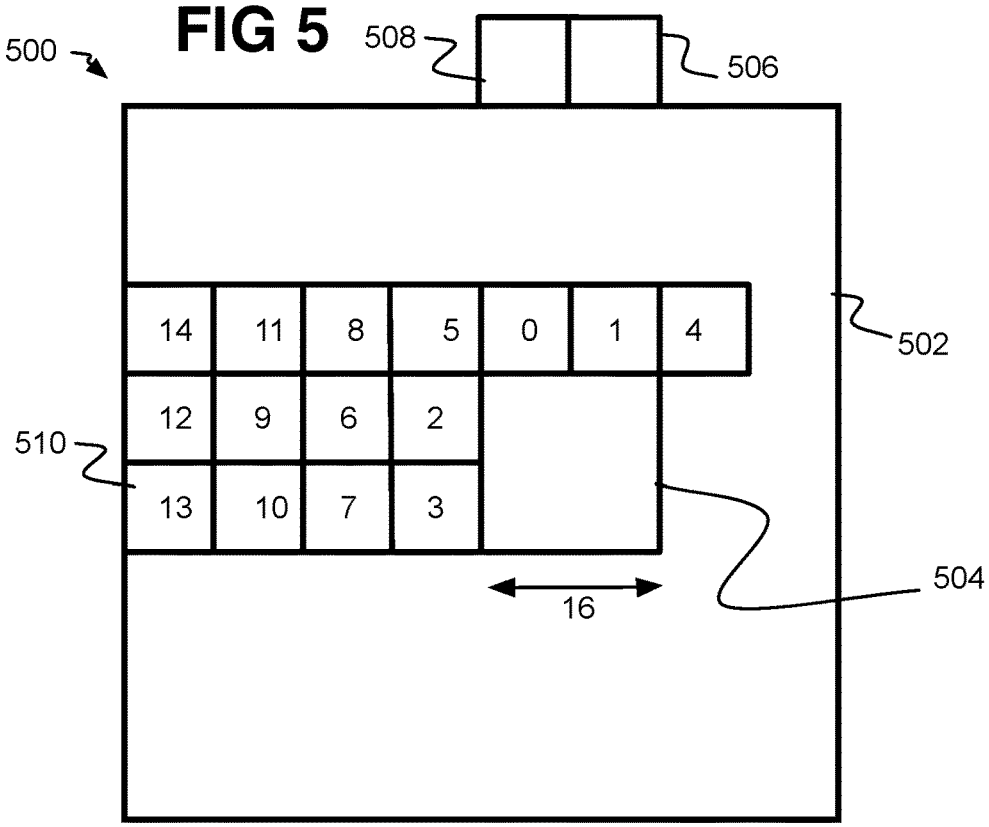

METHOD AND SYSTEM OF VIDEO CODING WITH CONTEXT DECODING AND RECONSTRUCTION BYPASS

PRIORITY

This application claims the benefit of U.S. Provisional Patent Application No. 62/379,574, filed on 25 Aug. 2016, entitled "METHOD AND SYSTEM OF VIDEO CODING WITH CONTEXT DECODING AND RECONSTRUCTION BYPASS", and which is incorporated by reference in entirety for all purposes.

BACKGROUND

Due to ever increasing video resolutions, and rising expectations for high quality video images, a high demand exists for efficient image data compression of video while performance is limited for coding with existing video coding standards such as VP9, Alliance Open Media Version 1 (AV1), H.264, H.265/HEVC (High Efficiency Video Coding) standard, and so forth. The aforementioned standards use expanded forms of traditional approaches to address the insufficient compression/quality problem, but often the results are still insufficient.

Conventional video codec divides video frames into blocks and then encodes or decodes the frames block by block. This may include prediction blocks of various sizes that are reconstructed at a decoding loop of an encoder. The prediction block is then differenced from the actual image data of a matching block, and this difference or residual is encoded and transmitted to a decoder instead of all of the image data of the actual block. The residuals are formed into transform coefficient blocks that may be different sizes than the prediction blocks and for further compression and transmission to a decoder. The decoder then reverses the process to reconstruct the frames by applying an inverse transform to reconstruct residuals at coding unit blocks from decoded transform coefficient blocks, and then copying the decoding loop of the encoder by decoding the prediction blocks by using inter-prediction (temporal reference blocks) and intra-prediction (spatial reference blocks). The inter-prediction, however, still uses spatial neighbor blocks to reconstruct context to determine which reference block(s) on a reference frame match a current block on a current frame being decoded. Such context may include an inter-mode (which inter-prediction mode is to be used for a block), motion vectors and reference block identification also both for inter-prediction, reconstructed pixel blocks for intra-prediction, and transform coefficients.

During these processes, the decoding of one current block may require the coding system to wait for the decoding of other spatial neighbor blocks that form the context to decode that current block. This can cause substantial delays or latency in the decoding of the video frames including stalls noticeable to the user.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 3 is a flow chart of a method of video coding with context decoding and reconstruction bypass according to the implementations herein;

FIG. 4 is a schematic diagram of a large block of a frame of image data with an arrangement of at least one context block and a current block to be decoded used to explain video coding with context decoding and reconstruction bypass according to the implementations described herein;

FIG. 5 is a schematic diagram of a large block of a frame of image data with another arrangement of at least one context block and a current block to be decoded used to explain video coding with context decoding and reconstruction bypass according to the implementations described herein;

DETAILED DESCRIPTION

Figure 1:
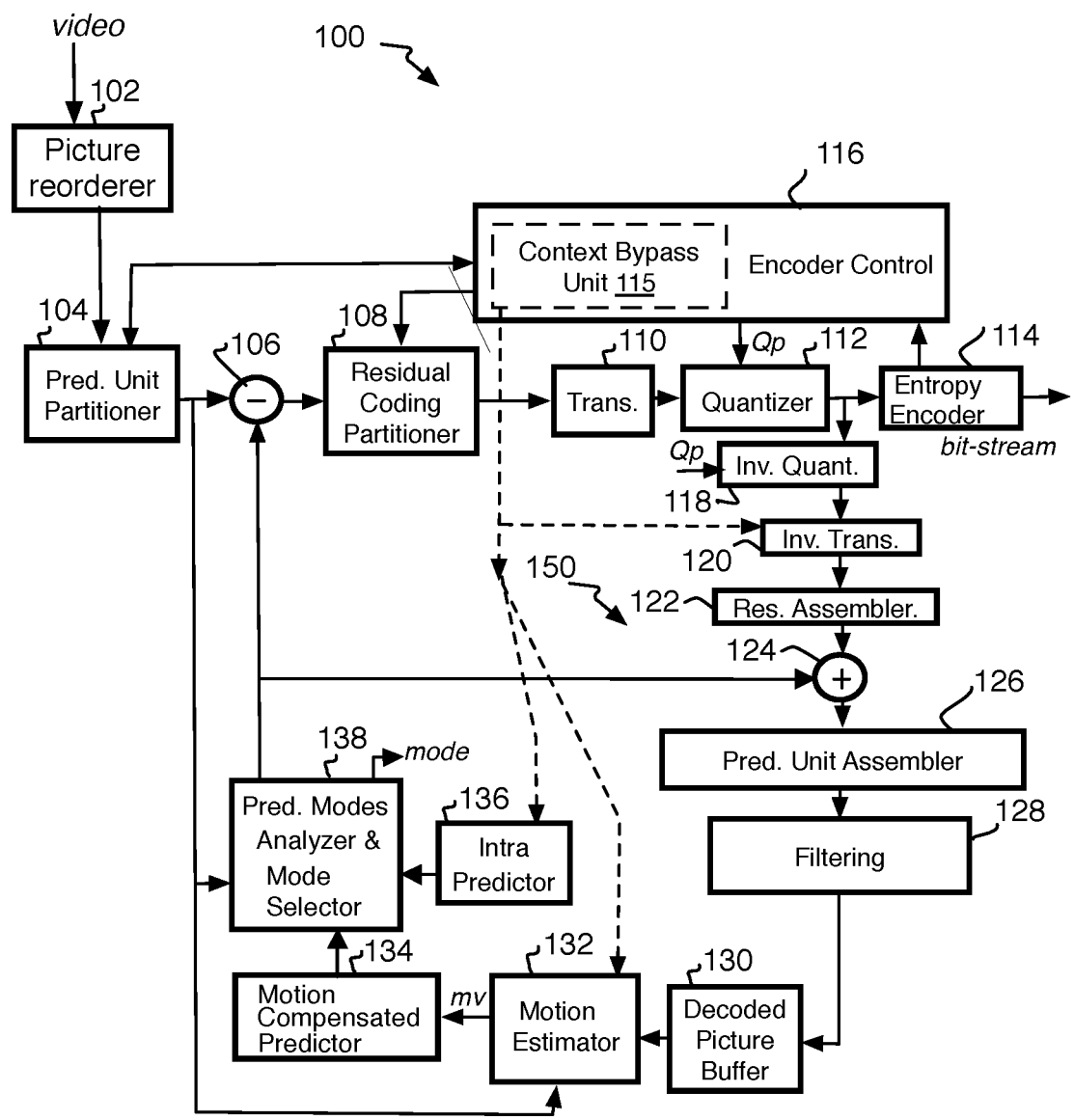
FIG. 1 is an illustrative diagram of an example encoder for a video coding system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, tablets, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to video coding with context decoding and reconstruction bypass.

As mentioned, a number of sub-processes exist within encoding and decoding of video frames that may require the system to wait for the decoding and reconstruction of context from spatial neighbor blocks in the same frame as a current frame in order to decode the current block. One example of this is inter-prediction which includes generation of motion vectors by a motion estimation unit during inter-prediction on an encoder side, and reconstruction of the motion vectors on a decoder side. During motion estimation, temporal redundancy is reduced to determine where the same or similar image data has moved between a reference frame and a current frame being analyzed. The motion is represented by a motion vector that indicates where a block has moved from frame-to-frame. Motion compensation is then performed to apply the motion vector to construct a prediction block for a current frame to be reconstructed.

The motion estimation may be performed in a number of ways. One way is to perform a search on a reference frame for one or more blocks that match a block being analyzed on the current frame. The searches, however, can be very computationally large. Thus, in order to reduce the number of searches that must be performed, a spatial technique may be applied as well. This includes computing a motion vector for a current block being analyzed by using the motion vectors of other neighbor blocks next to the current block on the same frame. This is often some mathematical combination of the motion vectors on adjacent blocks such as a mean or median motion vector of the block or blocks above and to the left of the current block. Neighbor blocks near a current block being analyzed may be used because neighbor blocks are likely to correspond to the same moving object with similar motion and the motion of the object is not likely to change relatively abruptly from one frame to the next. Maintaining these spatial dependencies between blocks on the same frame can be essential for a quality encoder to provide very accurate high quality images. The motion vectors are then compressed and transmitted to the decoder, where the decoder may use the same type of spatial neighbor block reconstruction to reconstruct a motion vector. In the case of the decoder, however, the decoder must wait for the context of the spatial neighbor blocks to be decoded in order to use the context to decode a current block. As mentioned, when delay occurs with decoding, which can be caused by many different factors as explained below, a bad quality video may result.

Specifically, specialty fixed function hardware and graphics processing unit (GPU) resources are often used to speed up video encoding and form the pipeline for performing the coding tasks. Such hardware or pipeline may have parallel lines (or parallel circuits or units) that perform many simultaneous computations of the same or differing tasks which can be very efficient when the same computation must be performed for thousands of blocks of pixel data in order to decode a frame. Thus, while one pipeline unit is de-entropy decoding data of some image data blocks from bits to symbols (numbers or letters) for example for one large block of a frame (such as a super-block or large coding unit (LCU)), another pipeline unit may be using symbols to reconstruct the coding tools (which may be referred to herein as context or syntax tools or supporting data) such as motion vectors (MVs) on another large block of the same frame. The pipeline conventionally operates on a granularity of some large block of the frames such as the super-block or the LCU.

Applying the hardware to the current example, since the analysis of a current block must wait for the motion vectors to be determined on the spatial neighbor blocks that the current block depends upon, this makes the hardware run less efficiently. Specifically, these inter-prediction techniques that heavily rely on spatial dependencies restrict the amount of parallelism, or the amount of blocks that can be analyzed at the same time. When the spatial dependent block decoding is performed by traditional wavefront or raster order techniques where the system waits to analyze a wave or line of front blocks until after the analysis of a previous line of blocks is complete and their motion vectors established, this significantly underutilizes and slows a hardware system with parallel computational capacity, potentially causing large latencies in the time from receipt of the data as an input at a decoder to the time the decoder provides an output. When these delays accumulate, they may be eventually perceived as pauses or stops in a video sequence being displayed to a user.

Regarding this as one specific example, probability model context(s) may be computed by the arithmetic decoder in order to decode the inter-mode of a block to determine which inter-prediction mode is to be used when multiple inter-prediction modes are available, such as modes that use different reference frames for example or whether to use spatial neighbor blocks. When a block has its inter-mode set to use spatial neighbor context, the context can be derived using neighboring blocks' information, such as neighboring modes and motion vectors. Because of the nature of the arithmetic decoding process, the decoding of the bits following the bits representing the inter-mode cannot proceed until the inter-mode is decoded by the arithmetic decoder. In other words, the arithmetic decoding process is a sequential process. In state-of-the-art arithmetic decoders, the probability model context is computed using information from blocks neighboring to the one currently decoded. Such information could be known to the arithmetic decoder. For example, previously arithmetic decoded inter-prediction modes could be known on the neighbor blocks themselves. Other such information only could be known by other pipeline units of the video decoder, such as reconstructed motion vectors and corresponding prediction blocks (or in other words, the identification of reference blocks on reference frames) of blocks which are neighbors of the one currently decoded. Again, for the case when such information only could be known by other pipeline units of the video decoder, the video decoder pipeline is usually generating such information with some latency. Because of such latency, the arithmetic decoder may stall, waiting for the information to be generated and transmitted to the arithmetic decoder. As mentioned, this stall limits the throughput/performance of the arithmetic decoder.

As another example, during intra-prediction, the image data or pixels (chroma and luminance values) of adjacent blocks may be used to determine the image data of a current block, and the same disadvantages may arise where a current block is waiting for the decoding of pixel data on spatial neighbor blocks before the current block can be decoded. This also is applicable to the decoding of residual coding unit blocks where neighbor transform blocks of transform coefficients are used to construct a coding unit (CU) block of a residual. During decoding, the decoder must wait for the neighbor transform blocks of a CU to be decoded before reconstructing the transform blocks and in turn the residual of the CU, creating a similar dependency on neighbor blocks. Thus, in other words, in known video codec(s), the arithmetic codec throughput or performance can be the bottleneck of video codec(s) which need to support high bit-rates or high quality such as the situations just described.

Thus, the present bypass methods here seek to reduce or completely remove the arithmetic decoder stall by having the probability model contexts generated using information of blocks which are close to the one currently decoded, thus preserving coding efficiency, but which have been decoded by other components of the video decoder pipeline by the time the arithmetic decoder needs them to compute the probability model contexts of the current block.

To accomplish this and resolve the issues mentioned above, the processes herein relax or remove the dependency of decoding of elements of a current block based on the reconstruction of elements of the neighbor blocks. Specifically, the use of compressed data may involve two operations. The first operation is also referred to as decoding which refers to extracting bits from compressed data (whether or not from a bitstream) and converting those bits into symbols (such as numbers). This may be referred to as symbol decoding for clarity. The second operation is reconstruction that reconstructs elements or tools from the symbols, such as motion vectors as one example. It will be understood that decoding here may refer to this specific definition or a general term meaning any operations included in decoding depending on the context of the language herein.

One solution to the dependency explained in detail below is a first method (or exterior block method). Large blocks such as LCUs or super blocks that are 64×64 pixels for example are used as the pipeline granularity as mentioned above. The large blocks are divided into small blocks for more efficient handling of data, where the small blocks can range from 16×16 macroblocks to 4∴4 blocks for the prediction blocks and the residual coding unit blocks as described in detail below. Typically, the small blocks may be 8×8 blocks and are decoded within a large block in a waveform or raster order. Exterior blocks are prediction size blocks from a different large block than a current large block that has a current block being decoded where the exterior blocks have already been fully decoded (fully constructed context is available) by a different pipeline unit than the pipeline unit processing the current large block. The system uses the already available context data of exterior blocks instead of waiting for the late context of the spatial neighbor blocks of the current large block.

By a second method (the symbol context method), the advantages of an arithmetic decoder are used when the fully constructed context of syntax elements from the spatial neighbor blocks is not yet available (not fully reconstructed yet), but the symbols of the spatial neighbor blocks have already been entropy decoded (or symbol decoded). There is a point in time then when the current block being decoded does not yet have its symbols decoded while the spatial neighbor blocks already have their symbols decoded. In this case, instead of using the reconstructed syntax elements of context blocks, the already symbol decoded symbol context of neighbor blocks can be used even though the syntax elements have not yet been fully reconstructed for those spatial neighbor blocks.

Specifically, in arithmetic decoder(s), the symbols that precede or are close to the symbol (herein referred to as SymbolToBeDecoded) that is about to be decoded relative to location on the frame such as adjacent small blocks can be used to change the estimation of the probability model of SymbolToBeDecoded. The probability model represents a prediction of which symbol will occur from entropy decoding (symbol decoding) for the current block. The more accurate the prediction, the better is the coding efficiency of SymbolToBeDecoded. In a simple case, a number of fixed probability models exist that could be used to entropy decode the symbols (SymbolToBeDecoded) of the current block being decoded. The already decoded and available symbol context that precedes or is close to SymbolToBeDecoded are used to determine which probability model is to be selected. The value of the symbols of the spatial neighbor blocks may be combined (added, etc.) to determine which context or probability model to use. The selected probability model can then be used to entropy decode the symbols of the current block, and then the current block uses its symbols to reconstruct its syntax elements. This may include reconstructing the transform coefficients, pixel data for intra-prediction, motion vectors, identity of reference (or prediction) blocks, and the inter-mode of the current block being decoded all normally obtained from the spatial neighbor blocks. The details for implementing one or both of these methods are provided below.

Figure 2:
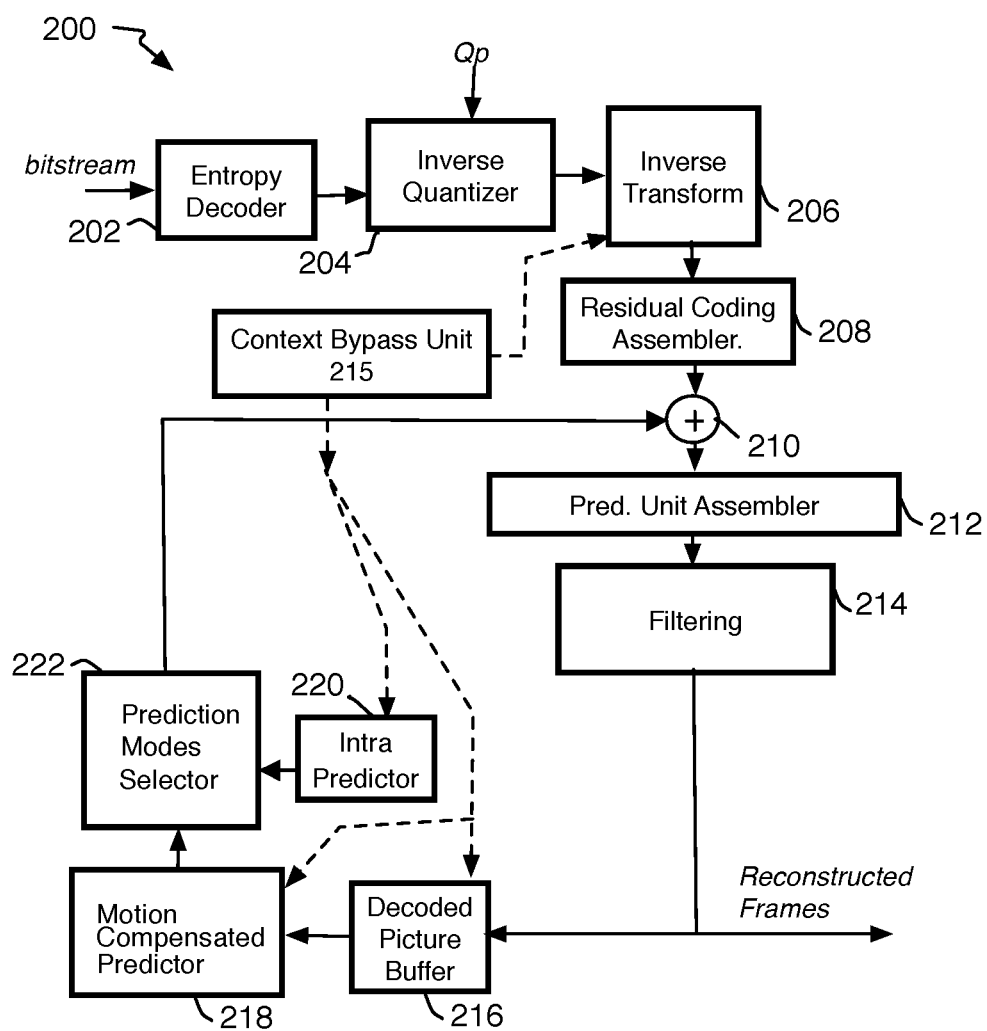
FIG. 2 is an illustrative diagram of an example decoder for a video coding system.
Figure 12:
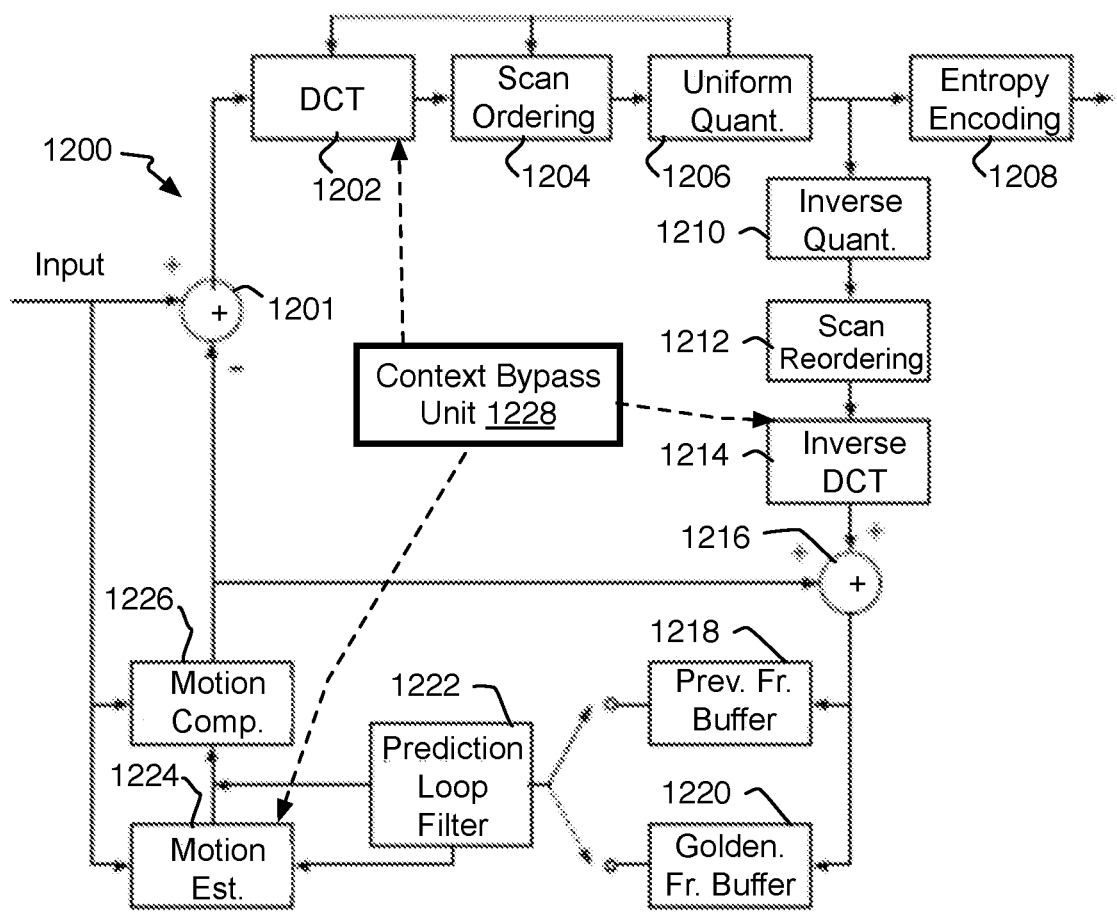
FIG. 12 is an illustrative diagram of another example encoder for a video coding system.
Figure 13:
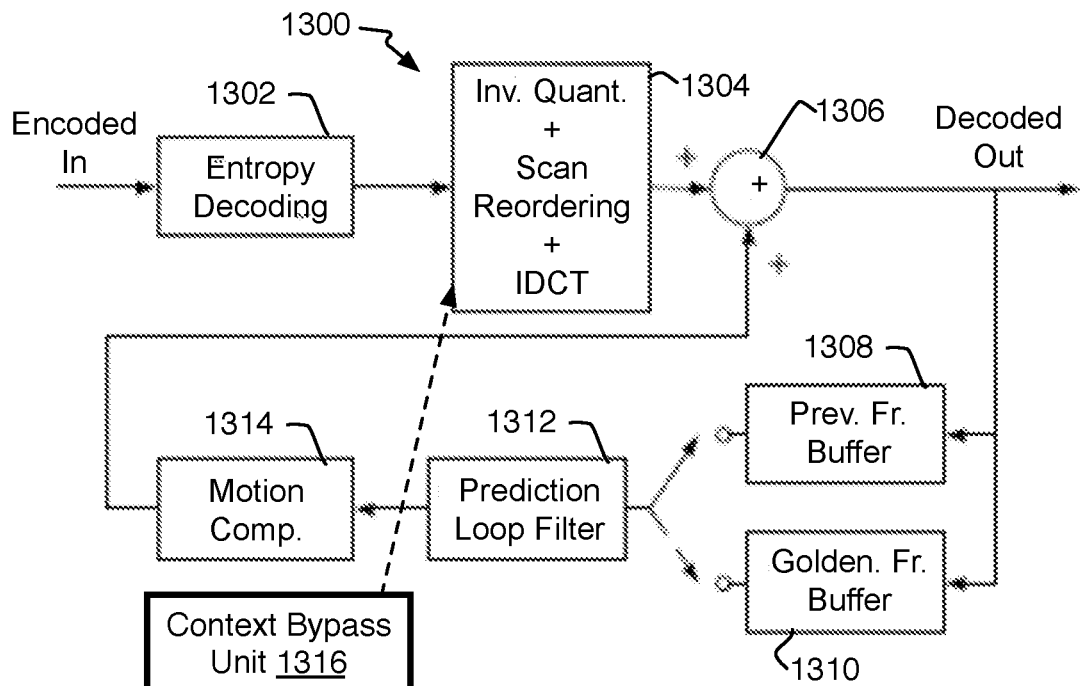
FIG. 13 is an illustrative diagram of another example decoder for a video coding system.

Referring to FIGS. 1-2, example arithmetic encoder 100 and decoder 200 is shown although the coders tend to represent more of an HEVC-type of encoder and decoder. FIGS. 12 and 13 below are diagrams that show example arithmetic VP9 encoder 1200 and decoder 1300 respectively. Many of the relevant components described for coders 100 and 200 may apply equally to VP9 coders 1200 and 1300 such that the description of all of the components of the VP9 coders 1200 and 1300 is already provided with coders 100 and 200. Some other details regarding the VP9 coders are provided after the description of coders 100 and 200.

Referring now to FIG. 1, a video coding system 100 is described for better understanding of the implementations of the methods of video coding with context decoding and reconstruction bypass described herein, and is arranged to perform at least one or more of the implementations described herein. In various implementations, video coding system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, H.264 (MPEG-4), advanced video coding (AVC), VP8, H.265 (High Efficiency Video Coding or HEVC), VP9, Alliance Open Media Version 1(AV1), and others. Although system 100 and/or other systems, schemes or processes may be described herein, the present disclosure is not necessarily always limited to any particular video encoding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

For the example video coding system 100, the system may be an encoder where current video information in the form of data related to a sequence of video frames may be received for compression. The system 100 may partition each frame into smaller more manageable units, and then compare the frames to compute a prediction. If a difference or residual is determined between an original block and prediction, that resulting residual is transformed and quantized, and then entropy encoded and transmitted in a bitstream out to decoders or storage. To perform these operations, the system 100 may include an input picture buffer (with optional picture re-orderer) 102, a prediction unit partitioner 104, a subtraction unit 106, a residual coding partitioner 108, a transform unit 110, a quantizer 112, an entropy encoder 114, and an encoder controller 116. The controller 116 manages many aspects of encoding including rate distortion or scene characteristics based locally adaptive selection of right motion partition sizes, right coding partition size, best choice of prediction reference types, and best selection of modes as well as managing overall bitrate in case bitrate control is enabled to name a few examples.

The output of the quantizer 112 may be provided to a decoding or prediction loop 150 provided at the encoder to generate the same reference or reconstructed blocks, frames, or other units as would be generated at the decoder 200. Thus, the decoding loop 150 may use inverse quantization and inverse transform units 118 and 120 to reconstruct the frames, and residual assembler 122, adder 124, and prediction unit assembler 126 to reconstruct the units used within each frame. The decoding loop 150 then provides filters 128 to increase the quality of the reconstructed images to better match the corresponding original frame. This may include a deblocking filter, a sample adaptive offset (SAO) filter, and a quality restoration (QR) filter. The decoding loop 150 also may have a decoded picture buffer 130 to hold reference frames.

The encoder 100 also has a motion estimation module or unit 132 that provides motion vectors as described below, and a motion compensation module 134 that uses the motion vectors to form prediction blocks. The motion estimation unit 132 and motion compensation unit 134 form the inter-prediction capability of the encoder. It will be understood the motion estimator 132 may use a variety of techniques to form the motion vectors including block matching such as hierarchical motion estimation (HME), integer motion estimation (IME), and fractional motion estimation (FME), zero motion vectors (ZMVs) as well as spatial neighbor block dependencies as described herein. The inter-mode (inter-prediction mode) that is to be used, whether to use spatial neighbor blocks or otherwise, may be compressed and placed in a bitstream along with motion vectors and identity of reference blocks for the spatial neighbor blocks and to provide the context for the current block at the decoder. An intra-prediction module 136 provides the intra-prediction capability. Both the motion compensation module 134 and intra-prediction module 136 may provide predictions to a prediction mode analyzer and mode selector 138 that selects the best prediction mode (including inter-modes) for a particular block, typically based on bit-cost and other factors. The mode selector 138 may select an inter-mode or inter-prediction mode when multiple such modes are available. In addition to having a different inter-mode depending on the motion estimation technique used, the inter-modes may include modes that use different frames references. The selected inter-mode is compressed and placed in the bitstream with the other data. The present methods may be used to decompress the inter-mode at the decoder before applying that inter-mode to decode the context of a block.

As shown in FIG. 1, the prediction output of the selector 138 in the form of a prediction block is then provided both to the subtraction unit 106 to generate a residual, and in the decoding loop to the adder 124 to add the prediction to the residual from the inverse transform to reconstruct a frame. A PU assembler (not shown) may be provided at the output of the prediction mode analyzer and selector 138 before providing the blocks to the adder 124 and subtractor 106 for HEVC or VP9 operation to name a few examples.

More specifically now, the video data in the form of frames of pixel data may be provided to the input picture buffer 102. The buffer 102 holds frames in an input video sequence order, and the frames may be retrieved from the buffer in the order in which they need to be coded. For example, backward reference frames are coded before the frame for which they are a reference but are displayed after it. The input picture buffer 102 also may assign frames a classification such as I-frame (intra-coded), P-frame (inter-coded, predicted from a previous reference frames), and B-frame (inter-coded frame which can be bi-directionally predicted from a previous frames, subsequent frames, or both. VP# coders may add a golden reference frame as well which is a specific type of P-frame that is not necessarily consecutive with the current frame.

For VP9 coding, a frame may be divided into tiles which are large sections of the frame, which are then divided into 64×64 pixel super-blocks. The super-blocks may be divided into smaller blocks, typically 16×16 or 8×8 for prediction block sizes but could be as small as 4×4.

For HEVC coding, in each case, an entire frame may be classified the same or may have slices classified differently (thus, an I-frame may include only I slices, P-frame can include I and P slices, and so forth). In I slices, spatial or intra-prediction is used, and in one form, only from data in the frame itself. In P slices, temporal (rather than spatial) prediction may be undertaken by estimating motion between frames but also may include spatial dependencies to derive motion vectors as explained herein. In B slices, and for HEVC, two motion vectors, representing two motion estimates per partition unit (PU) (explained below) may be used for temporal (and spatially dependent MV) prediction or motion estimation. In other words, for example, a B slice may be predicted from slices on frames from either the past, the future, or both relative to the B slice. In addition, motion may be estimated from multiple pictures occurring either in the past or in the future with regard to display order. In various implementations, motion may be estimated at the various coding unit (CU) or PU levels corresponding to the sizes mentioned below. For older standards, macroblocks or other block basis may be the partitioning unit that is used.

Specifically, when an HEVC standard is being used, the prediction partitioner unit 204 may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block also may be divided into coding units (CU) in quad-tree split scheme. Further, each leaf CU on the quad-tree may either be split again to 4 CU or divided into partition units (PU) for motion-compensated prediction. In various implementations in accordance with the present disclosure, CUs may have various sizes including, but not limited to 64×64, 32×32, 26×26, and 8×8, while for a 2 N×2 N CU, the corresponding PUs also may have various sizes including, but not limited to, 2 N×2 N, 2 N×N, N×2N, N×N, 2 N×0.5 N, 2 N×1.5 N, 0.5 N×2 N, and 2.5 N×2 N. It should be noted, however, that the foregoing are only example CU partition and PU partition shapes and sizes, the present disclosure not being limited to any particular CU partition and PU partition shapes and/or sizes.

As used herein, the term "large block" may refer to an LCU or a super-block or other similar block set by a video coding specification or a block size that is the main granularity unit of the hardware that provides the pipeline for processing or coding the video frames. In other words, the pipeline may have a number of units—named stages in the following—each unit implementing a different part of the overall encoding or decoding process. The large blocks enter the pipeline sequentially and are processed sequentially by moving from stage to stage. Therefore different stages of the pipeline process a different large block at the same time. The large block may be divided into a variety of other small block sizes, such that the term "small block" may refer to a CU, or to a PU as described above and similar sizes for VP# coding, and a macroblock refers to a 16×16 size block. The blocks need not always be square shaped blocks. Non-square rectangular shapes also can be included as described above. By some alternatives, this may include considering the block a macroblock or a division of a macroblock of video or pixel data for H.264/AVC, AV1, VP8, VP9, and the like, unless defined otherwise. At a minimum then, a large block is a block that is divided into smaller blocks so that the smaller blocks can be reconstructed during a decoding process and proceed small block by small block.

Also in video coding system 100, the current video frame divided into super-block, LCU, CU, and/or PU sized units may be provided to the motion estimation unit or estimator 132. System 100 may process the current frame in the designated units of an image in raster or different scan order such as waveforms mentioned elsewhere herein. When video coding system 100 is operated in inter-prediction mode, motion estimation unit 132 may generate a motion vector based on spatial neighbor blocks. The motion compensation module 134 then may use the reference video frame and the motion vector provided by motion estimation module 132 to generate a prediction for each prediction block with a motion vector.

If inter-prediction is selected as the correct mode for a prediction block, the predicted block then may be subtracted at subtractor 106 from the current block, and the resulting residual is provided to the residual coding partitioner 108. Coding partitioner 108 may partition the residual into one or more blocks, and by one form for HEVC, dividing CUs further into transform units (TU). A transform module 110 then transforms the divided residual data of the TUs into transform coefficients using variable block size discrete cosine transform (VBS DCT) and/or 4×4 discrete sine transform (DST) to name a few examples. Using the quantization parameter (Qp) set by the controller 116, the quantizer 112 then uses lossy resampling or quantization on the coefficients.

During entropy encoding of context data such as the inter-mode, motion vectors, identity of reference blocks, intra-prediction pixel data, and transform coefficients, a context model or probability model for context-based adaptive binary arithmetic coding (CABAC) may be used that uses the symbol values of the spatial neighbor blocks to determine the symbols to compress at the encoder for the current block. Herein, this process may be reversed at the decoder, and may be used to perform the symbol context method as explained below.

The generated set of quantized transform coefficients may be reordered and entropy coded by entropy coding module 114 to generate a portion of a compressed bitstream (for example, a Network Abstraction Layer (NAL) bitstream) provided by video coding system 100. In various implementations, a bitstream provided by video coding system 100 may include entropy-encoded coefficients in addition to side information to be used to decode each block (e.g., prediction modes, quantization parameters, motion vector information, partition information, in-loop filtering information, and so forth), and may be provided to other systems and/or devices for transmission or storage.

The output of the quantization module 112 also may be provided to de-quantization unit 118 and inverse transform module 120 in a decoding loop. De-quantization unit 118 and inverse transform module 120 may implement the inverse of the operations undertaken by transform unit 110 and quantization module 112. A residual assembler unit 122 may then reconstruct the residual CUs from the TUs. The output of the residual assembler unit 122 then may be combined at adder 124 with the predicted frame to generate a rough reconstructed block. A prediction unit (LCU) assembler 126 then reconstructs the LCUs from the CUs to complete the frame reconstruction.

The reconstructed frames are filtered, and then provided to a decoded picture buffer 130 where the frames may be used as reference frames to construct corresponding predictions for motion estimation and compensation as explained herein. When video coding system 100 is operated in intra-prediction mode, intra-prediction module 136 may use the reconstructed pixels of the current frame to undertake intra-prediction schemes. Most involve using the decoded data from the left and/or upper prediction blocks relative to a current block being analyzed in a raster or waveform-type of scheme including upper diagonal blocks at the upper left and right corners of the current block.

While the context bypass unit 215 as described below is mainly for the use of the decoder 200, it will be understood that in some circumstances, when external memory is used and is too slow for example, a context bypass unit 115 could be used on the encoder 100 when context data is not obtained or generated in time to be used for context for a current block. The context bypass unit 115 monitors the GPU or pipeline encoding process to determine when such condition exists, and to direct context data from the exterior or spatial neighbor blocks for use with a current block. This may be performed for the inverse transform unit 120, intra-predictor unit 136 and motion estimation unit 132 to determine when spatial neighbor blocks will not have their context data decoded in time to provide context for a current block being analyzed. The details are provided below for the decoder.

In some examples, video coding system 100 may include additional items that have not been shown in FIG. 1 for the sake of clarity. For example, video coding system 100 may include a processor, a radio frequency-type (RF) transceiver, splitter and/or multiplexor, a display, and/or an antenna. Further, video coding system 100 may include additional items such as a speaker, a microphone, an accelerometer, memory, a router, network interface logic, and so forth. Some of these components are shown on other implementations described herein.

Referring to FIG. 2, a system 200 may have, or may be, a decoder, and may receive coded video data in the form of a bitstream and that has the image data (chroma and luma pixel values) as well as context data including residuals in the form of quantized transform coefficients, motion vectors, identity of reference blocks, and prediction modes for individual blocks. The system 200 may process the bitstream with an entropy decoding module 202 to extract quantized residual coefficients as well as the motion vectors, prediction modes, partitions, quantization parameters, filter information, and so forth. The system 200 then may use an inverse quantizer module 204 and inverse transform module 206 to reconstruct the residual pixel data. The construction of the residual pixel data may be performed by using spatial neighbor blocks as usual when the blocks are fully decoded. Otherwise, spatial neighbor blocks with decoded symbols or exterior substitute decoded blocks may be used to reconstruct the data of a current block as described below and in accordance with a context bypass unit 215.

The system 200 then may use a residual coding assembler 208, an adder 210 to add the residual to the predicted block, and a prediction unit assembler 212 for small blocks and large blocks (LCU or super-blocks for example). The system 200 also may decode the resulting data using a decoding technique employed depending on the coding mode indicated in syntax of the bitstream and implemented via prediction mode switch or selector (which also may be referred to as a syntax control module) 222, and either a first path including an intra prediction module 220 or a second path that is an inter-prediction decoding path including one or more filters 214. The second path may have a decoded picture buffer 216 to store the reconstructed and filtered frames for use as reference frames as well as to send off the reconstructed frames for display or storage for later viewing or another application or device. For VP# codecs, this may include reconstructing and storing golden frames as well. A motion compensated predictor 218 utilizes reconstructed frames from the decoded picture buffer 216 as well as motion vectors from the bitstream to reconstruct a predicted block. Thus, the decoder does not need its own motion estimation unit since the motion vectors are already provided, although it still may have one. Either way, the decoder 200 may have the context bypass unit 215 to monitor the pipeline units performing the processing, and by one form, at the large block granularity. When the context bypass unit 215 can determine that the spatial neighbor blocks will not have fully constructed context by the time a current block is ready to be decoded, the context bypass unit 215 will direct that spatial reconstruction context from exterior context-ready blocks or symbol context from spatial neighbor blocks be used to decode the current bock as explained below. The prediction modes selector 222 sets the correct mode for each block as mentioned, where the prediction mode may be extracted and decompressed from the compressed bitstream. A PU assembler (not shown) may be provided at the output of the selector 222 before the blocks are provided to the adder 210. The functionality of modules described herein for systems 100 and 200, except for the units related to the context bypass units 115 and 215 for example and described in detail herein, are well recognized in the art and will not be described in any greater detail herein.

Referring to FIGS. 12-13, an example VP9 encoder 1200 and an example VP9 decoder 1300 are provided to show another example video system with an alternative codec standard that could be used to implement the image data block decoding and reconstruction methods described herein. The VP9 systems 1200 and 1300 have many of the same or similar components as the encoder and decoder 100 and 200 described above, and the relevant aspects of VP9 codec are already mentioned above. It will be clear which components perform similar functions and need not be described here again. Both the VP9 encoder 1200 and decoder 1300 expressly add scan ordering (or reordering) unit 1204 or 1304 between a DCT or iDCT unit and a uniform quantization (or inverse quantization) unit, as well as a golden frame buffer 1220 or 1310. Each of these additional components are known in the VP9 codec and need no special explanation. It will be understood that the VP9 encoder 1200 and decoder 1300 each may have a context bypass unit 1228 and 1316 respectively and function as described with context bypass units 115 and 215.

Some video encoders are implemented in software and others with full or partial hardware acceleration. Fully hardware accelerated solutions don't offer as much scalability and flexibility as the partial or hybrid solutions. Herein, the efficiency of hybrid architecture for video encoding can be improved using the context decoding and reconstruction bypass methods described. With hybrid solutions, some work can be performed on execution units (EUs) and other work may be performed on fixed function hardware. To maximize the performance, the fixed function hardware is fully utilized. The present encoder that performs the methods described herein may use one or more video motion estimate (VME) engines as the main fixed function hardware.

Referring now to FIG. 3, an example process 300 is arranged in accordance with at least some implementations of the present disclosure. In general, process 300 may provide a computer-implemented method of video coding with context decoding and reconstruction bypass as mentioned above. In the illustrated implementation, process 300 may include one or more operations, functions or actions as illustrated by one or more of operations 302 to 308 numbered evenly. By way of non-limiting example, process 300 may be described herein with reference to operations discussed with respect to example systems 100, 200 or 900 from FIGS. 1, 2, and 9 respectively and where relevant.

The process 300 may comprise "obtain a plurality of frames of a video sequence wherein individual frames are divided into at least one large block divided into a plurality of small blocks of pixel data and comprising a current small block" 302. As mentioned, compressed data may be provided to a decoder. The state of the image or context data obtained, or the perspective of the component receiving the image or context data, depends on which context is to be used. Thus, the frames are processed as described above and the decoder performs inverse quantization and inverse transform to provide transform coefficients. The image data, here then, may be received where frames are ready for reconstruction of residual code units and are waiting for the reconstruction of spatial neighbor transform coefficients. Otherwise, the decoder also may have reconstructed the frame's partitions to form large super-blocks or LCUs divided into smaller prediction blocks, which may or may not be various pixel sizes as already described above. Relevant here, the decoding of current prediction blocks may be waiting for the decoding of context from the spatial neighbor blocks. Also, the large block may refer to the block unit handled by one of a number of parallel circuits of a GPU or other such pipeline architecture at a time such that the GPU has all of the data of a single large block being processed each at a parallel pipeline unit. The smaller blocks may be MBs, CUs, PUs, TUs, and so forth. By other examples, the large block may be one that is divided into smaller blocks for reconstructing the smaller blocks as individual units. The reconstruction of the smaller blocks may proceed in raster or waveform order in each large block, or other orders.

The process 300 also may comprise "identify at least one spatial neighbor block of the same large block as the current small block and that is to be used to decode the current block" 304. Also as described herein, spatial neighbor blocks, which may or may not include blocks that are adjacent the current small block to be decoded, may have previously decoded context data to be used to decode the current small block. During normal operation, the spatial neighbor blocks in the large block may be inter-prediction blocks and, once decoded, will have an inter-prediction mode, a motion vector, and/or identity of one or more reference blocks (blocks to be used as a reference for the spatial neighbor block). For intra-prediction blocks, the spatial neighbor blocks may have pixel data (chroma, luma, or related values), and transform blocks may have coefficients that are combined to form a coding unit (CU) to reconstruct a residual. By one form, a standard codec such as HEVC or VP9 for example, or a customized codec may only use certain block positions relative to the current small block to use as spatial neighbor blocks, such as the adjacent left and upper blocks. Many other block patterns are used including a variety of blocks in addition to two spatial neighbor blocks. Often, a combination of the context data in multiple spatial neighbor blocks, such as an average, is used to reconstruct the data for the current small block to be decoded.

The process 300 then may include "determine whether fully constructed context to be provided by the at least one spatial neighbor block will be available when the current small block is ready to be decoded" 306. Thus, the coder or other system may be monitoring the flow of the decoding, such as by monitoring data entering and/or exiting a GPU, SoC, or other processor for example. With the knowledge of how long it takes to process certain tasks by the processor or hardware performing the processing, the system can determine if a spatial neighbor block will have its context data sufficiently fully reconstructed to be able to be used in time to decode the current small block. Monitoring the decoding processing avoids delay that can be caused by actually waiting and seeing if the spatial neighbor block has its context data fully reconstructed. In an alternative, a communication protocol could inform the system when a spatial neighbor block has its context data sufficiently fully reconstructed to be able to decode the current small block.

Process 300 also may include "use already available context data of at least one context-ready block when fully constructed context of the at least one spatial neighbor block is not available to decode the current small block" 308. Here, context-ready block may refer to a couple of different things. First, a context-ready block may be one that is exterior to the current large being processed with the current small block being decoded. Thus, the system may look to another large block such as one adjacent the current large block where all or individual small blocks of the adjacent block are already have decoded and fully constructed context. Then these exterior context-ready blocks may be used instead of the spatial neighbor blocks that should have been used if their context data had been decoded in time.

The details of the possible locations of the exterior blocks are provided below but generally may include, in an adjacent large block, the row or column of small blocks that are adjacent to the current large block being analyzed. Also, the exterior small blocks may be in the same column or row as the row or column of the current small block so that the exterior block is exactly to the left or exactly above the current small block, although the current small block and the exterior blocks are not necessarily the same size. Otherwise, the exterior blocks may provide some average of context values, and be aligned in a row or column along the edge of the current large block or some other pattern. The details are provided below.

As another alternative, or in addition to the use of the exterior blocks, the context-ready block to be used for decoding the current small block may refer to the spatial neighbor blocks but that at least have decoded symbol context (numbers) and that is the already available decoded context data, but do have the context tools (such as inter-mode, motion vectors, identity of reference blocks, full transform coefficient, intra pixel values, and so forth that is the full reconstructed context). In this case, the symbol context is used to select the probability model among a plurality of possible probability models of the symbols to be reconstructed at the current small block. The modified probability models are then used to select the symbol context of the current small block, which is then used to reconstruct the context tools of the current small block. The details are provided below.

It will be understood that a system or coder could implement the decoding process here for inter-prediction, intra-prediction, and/or transform coefficients, or any combination of these, and could provide the option (selected by the system automatically, programmer, or user for example) for implementing any one or combination of these. Also, the system or coder could use the exterior block method, the symbol context method, or both, or may provide the option for any of these as well.

It will also be understood that while the present methods are mainly directed to decoder operation, the methods could be applied at the decoding loop of the encoder as well when it is determined that context generation (or retrieval of context data from memory) is going to be late for spatial neighbor blocks of a current block being decoded at the decoding loop of the encoder.

Thus, these methods may be used to limit or remove the dependency between the computation of the probability model context(s) used by an arithmetic codec to encode and/or decode spatial neighboring blocks' inter-modes, motion vectors, reference frame identities, intra-pixel date, and transform coefficients, for example.

Referring now to FIG. 4, a frame 400 is shown with a large block 402 and small blocks 408 to demonstrate the exterior block method. For the exterior block method, the probability model context(s) used by an arithmetic decoder in order to decode the inter-mode (or other syntax elements) of a block for example uses only data of blocks which are outside the current block's large block. A number of hardware decoder's pipelines are large block (such as super-block or LCU) based, where the large blocks are defined either by the video codec specifications, or by the architecture of the decoder implementation. A large block based pipeline then processes the data of one large block at a time. Therefore, if the data used by the current block's arithmetic decode is from one or more blocks exterior to the large block of the current small block, and in a large block already decoded (or at least ahead in decoding), then such data will be available by the time the entropy decoder needs it to compute the probability model context(s) used which is needed to decode the bits representing the inter-mode. Therefore, the arithmetic decoder is not stalled in this case.

An example of how the exterior block method is applied for spatial motion vector generation is provided by frame 400 with large block 402, such as a super-block by one example, and that is divided into smaller blocks 408, some of which are shown and numbered 0 to 9, which may be the order of contributing context to current small block C (406). The current small 8×8 block C 406 is to be decoded and belongs to the large block 402. Normally, the data of neighbor blocks 0 and 1 would be used to decode current block 406 by providing motion vector data that may be combined into an average for example. Here, the data is not yet decoded, either not yet de-entropy decoded at all (the symbol context is not decoded yet), or the motion vectors for those neighbor blocks 0 and 1 are not reconstructed yet. In this case, an exterior block (or distant or far block) 404 is used instead that has already been decoded as part of a prior large block that was ahead in the decoding order in the bitstream transmitted to the decoder.

The exterior block should be in the closest position within an adjacent large block (or just outside the current large block). This usually will be adjacent or along the edge of the large block 402 and in the same column or row as the current block 406, but this need not always be so.

The exterior block could have other positions farther from the current block, but the accuracy of the motion vector of the current block is likely to be reduced as the exterior block is positioned father from the current block. The exterior block can also be a different size than the current block, and does not necessarily need to align exactly with the width of the column or row (or dimensions) of the current block as shown in FIG. 5.

Referring to FIG. 5, frame 500 provides an additional example of how the exterior block method is applied. In this additional example, a frame 500 with a large block 502 has a current small 16×16 macroblock 504 to be decoded. Other blocks 510 numbered 0 to 13 are also within the large block 502. When the neighbor blocks such as 0 and 1 are not yet decoded, the previously decoded data of two 8×8 exterior blocks 506 and 508 on the outer edge of the large block 502 (or in other words, adjacent the large block 502) may be used instead to form the context for the current block 504. The exterior blocks 506 and 508 may be used to compute the probability model contexts used by an arithmetic decoder to decode the bits representing the mode (the motion vector and other inter-prediction data, intra-prediction data) of the current 16×16 block 502. The context values of the two exterior blocks 506 and 508 can be combined, such as by an average or other combination, to apply to the current small block C (504).

Therefore, one or more blocks exterior to a large block (such as a super-block or LCU or large block size that is the granularity of the pipeline being used) and which may be smaller or larger than the current block can be used to compute the probability model contexts used by the arithmetic decoder to decode the bits representing the mode of the current block. Therefore, in the exterior block method, the dependency between the computation of probability model contexts used by an arithmetic codec and the reconstruction of elements in a video decoder or encoder pipeline using such arithmetic codec is reduced or relaxed.

Figure 6:
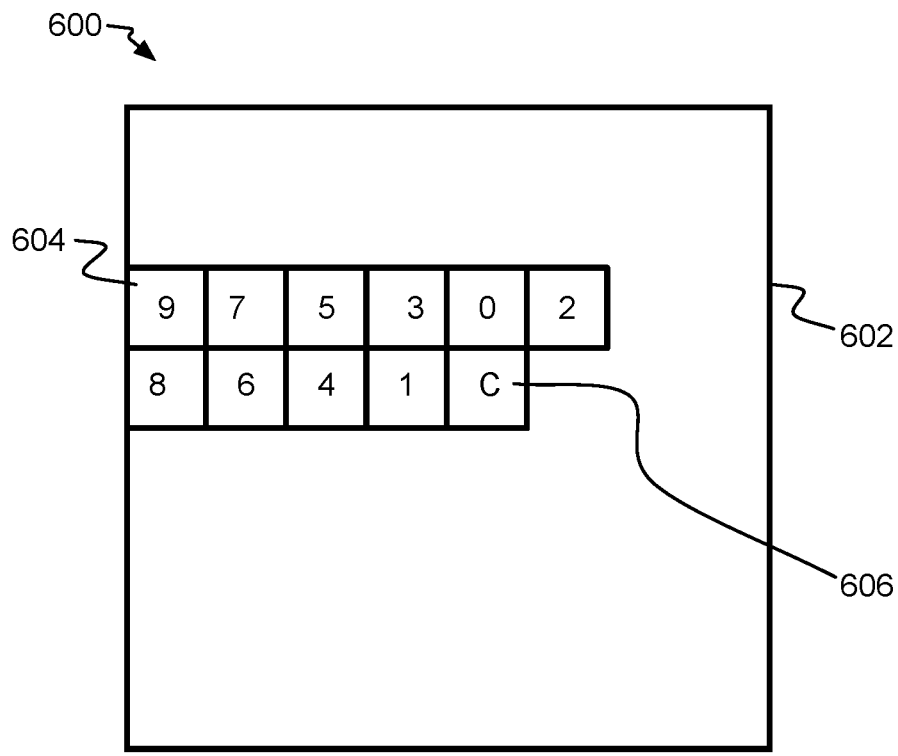
FIG. 6 is a schematic diagram of a large block of a frame of image data with yet another arrangement of at least one context block and a current block to be decoded used to explain video coding with context decoding and reconstruction bypass according to the implementations described herein.

Referring to FIG. 6, a frame is provided to demonstrate the application of the symbol context method. In this method, such dependency on full reconstruction of syntax elements at other spatial neighbor blocks may be completely removed by entropy decoding the symbol data of the current small block (that is not decoded yet) by using symbol data of the spatial neighbor blocks and that is generated by the arithmetic decoder and is already known by other units of the video decoder pipelines. Because this data is generated by the arithmetic decoder, it can be stored and accessed as soon as it is needed to form symbols for the current block that can be used to reconstruct its own elements. For the example used in this description, the symbol data generated by the arithmetic decoder and used by the same arithmetic decoder to compute the probability model symbol context of the current block includes the symbols for an inter-mode of neighboring blocks. Other data could be decoded as well such as motion vectors, identity of reference blocks, intra-prediction pixel data, and/or transform coefficients for example which could be obtained at the decoder.

In the example of frame 600, a large block 602, which may be a super-block or LCU, may be divided into small blocks 604 numbered 0 to 9 and a current 8×8 block 606 to be decoded by using the other small blocks such as blocks 0 and 1. For the present example, the inter-mode of blocks 0 and 1 are used to compute the probability model contexts used by the arithmetic decoder to entropy decode the bits representing the mode of the current small 8×8 block. The decoded bits, as the modified symbol context of the current block, are then used to reconstruct the decoding elements (or prediction tools, and so forth) for the current small block C (606). More details are provided below for the symbol context method.

Figure 7:
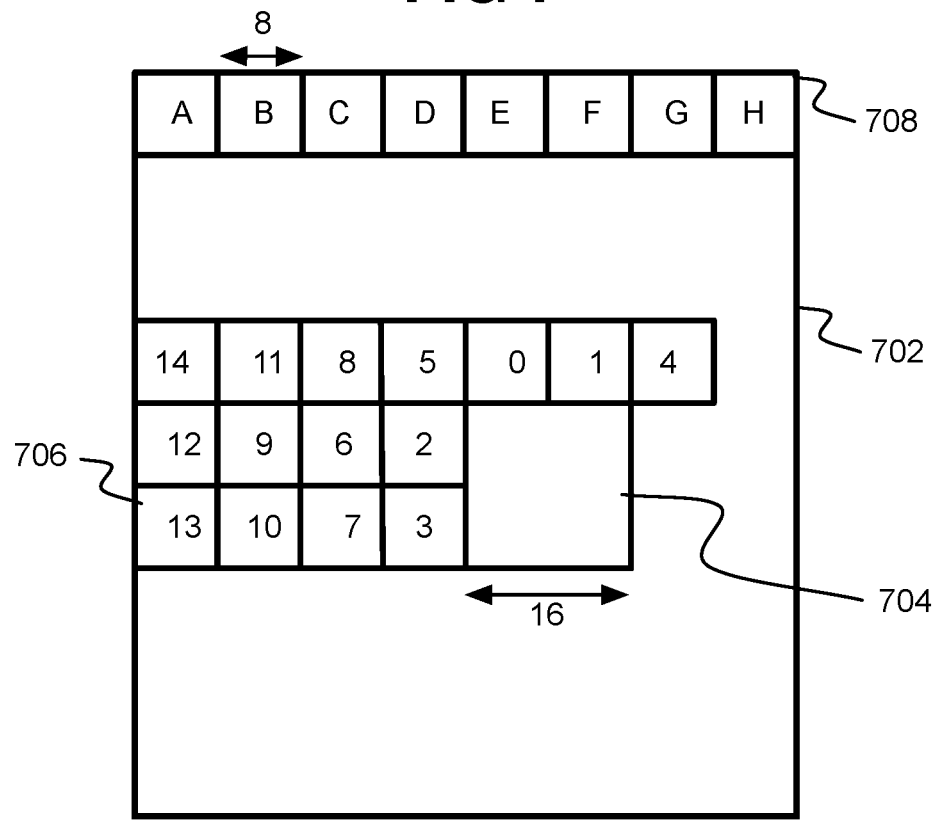
FIG. 7 is a schematic diagram of a large block of a frame of image data with a further arrangement of at least one context block and a current block to be decoded used to explain video coding with context decoding and reconstruction bypass according to the implementations described herein.

Referring to FIG. 7, a frame 700 is provided to explain how both the exterior block method and symbol context method could be used together. The frame 700 has a large block 702, and is divided into blocks including blocks 0 to 14. A current small block 704 may be 16×16 pixels (or macroblocks size). The exterior blocks (A . . . H) are outside of the current large block (or super-block) 704. The inter-modes and block sizes of any subset from interior blocks (0 . . . 14) and exterior blocks (A . . . H), combined with the motion vectors of any subset or all blocks from exterior blocks (A . . . H), associated with the mode and block size of a current block 704, can be used together so that the motion vectors can be used by the current block while the symbol context is used to compute the probability model contexts used by the arithmetic decoder to decode the bits representing the mode of the current 16×16 block. Thus, the interior blocks such as 0, 1, 2, and 3 (706) may provide symbol context while the exterior blocks A . . . H in an adjacent large block may provide fully constructed context, which then can be combined in many different ways. For example, an average of A to H may be used, or just E and F may be used with or without the symbol context of 0 and 1 that align with current block 704. Also, the symbol context may result, via the probability model in a certain element value of the current small block 704, and this value may be averaged for the same element with the value of the exterior blocks for example. Otherwise, the fully constructed context of the exterior blocks A to H and the symbol context of the spatial neighbor blocks 0 and 1 each may contribute to different syntax elements of the current block (the inter-mode versus motion vectors as mentioned).

Figure 8:
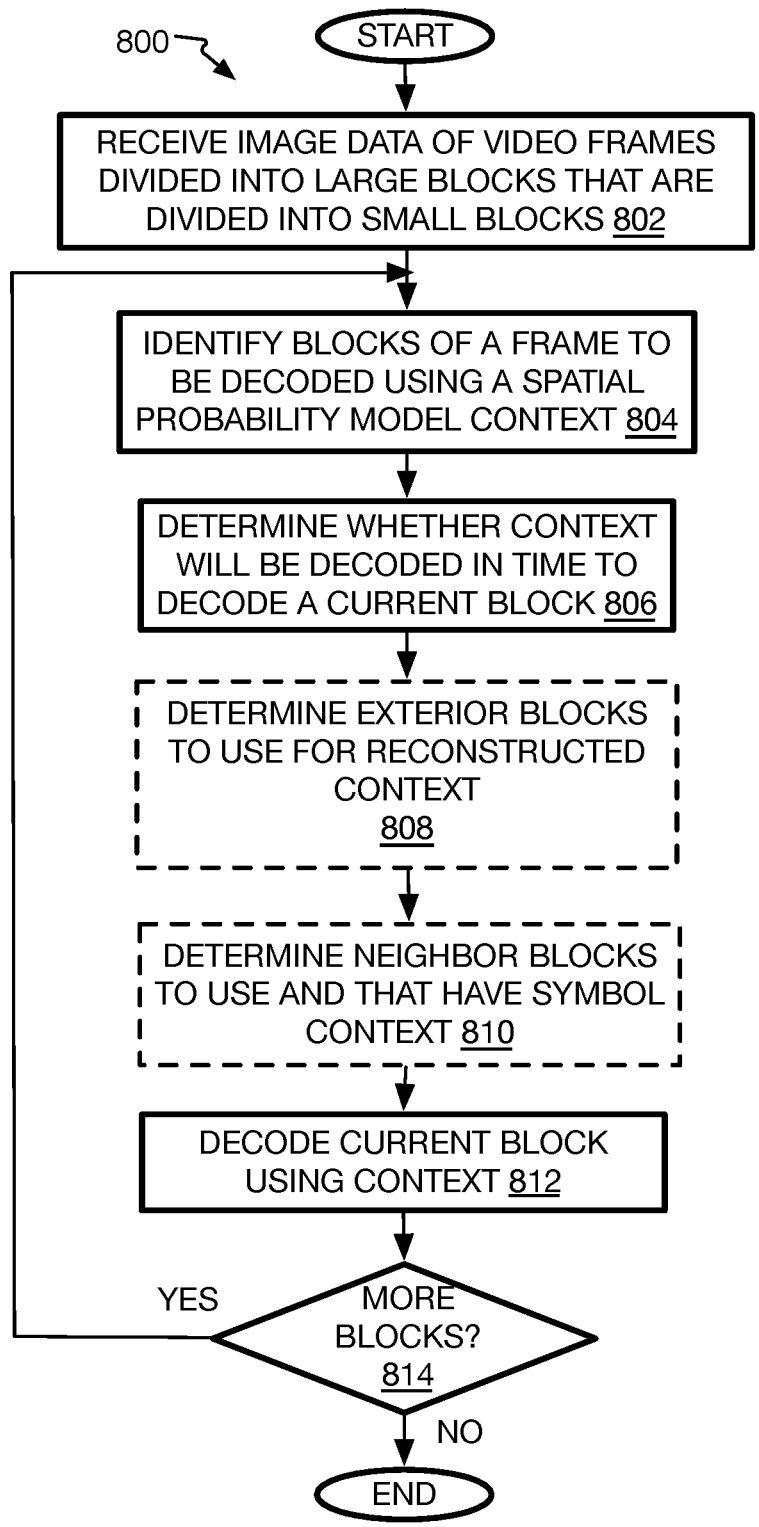
FIG. 8 is a detailed flow chart of video coding with context decoding and reconstruction bypass according to the implementations herein.

Referring now to FIG. 8, an example process 800 is arranged in accordance with at least some implementations of the present disclosure. In general, process 800 may provide a computer-implemented method of video coding with context decoding and reconstruction bypass. In the illustrated implementation, process 800 may include one or more operations, functions or actions as illustrated by one or more of operations 802 to 814 generally numbered evenly. By way of non-limiting example, process 800 may be described herein with reference to operations discussed with respect to FIGS. 1-2 and 9 herein and may be discussed below with regard to example systems 100, 200 or 900.

Process 800 may include "receive image data of video frames divided into large blocks that are divided into small blocks" 802. At the decoder, this refers to receiving compressed image data from a bitstream and that includes frames of a video sequence that each includes pixel image data (such as color, or chroma and/or luma pixel values). This also refers to receiving decompressed partitioning data that was in the bitstream (or is part of the codec standard for the decoder partitioning) to indicate the frames have been partitioned into large blocks including super-blocks or LCUs that are divided into smaller prediction blocks and/or transform units, as described in detail above. As mentioned above, by one form, the large blocks are the granularity of pipeline units that each handle a different large block. Such a pipeline may be established by GPUs or ISPs, and are able to hold the data of a single large block at a time. For the transform units (TUs), this operation may refer to receiving image data in the form of transform coefficients that were generated from inverse quantization, and now the decoder is waiting for entropy decoding, or the context reconstruction such as transform coefficients to be inverse transformed into residual data to reconstruct residual coding unit blocks (CUs). Because the inverse transform could be late in providing the syntax elements (the residual data parts), or any other operation upstream from the inverse transform such as entropy decoding could be late, the encoder, and therefore the decoder, may decide to use the exterior block method or symbol context methods or both (or neither) described herein to reconstruct the current block to be decoded. This is described below with operation 806.

Likewise, the received image data may be in the form of prediction block partitions that are to be decoded with inter-prediction or intra-prediction. In the case of inter-prediction, the decoder may be waiting for decoding (referring to both symbol decoding and syntax tool reconstruction) of context data such as inter-mode indication, motion vectors, and/or identification of reference blocks for inter-prediction, or pixel image data for intra-prediction. Again, if these syntax elements are late, then the decoder may use the exterior block method or symbol context method described herein.

Process 800 may include "identify blocks of the frame to be decoded by using a spatial probability model context" 804. Here, the decoder proceeds with inter-prediction, intra-prediction, or residual reconstruction, and proceeds reconstructing small blocks in a large block in some predetermined order whether a waveform order or raster order, or other order. The first blocks may be performed by waiting and generating a small block's own context (inter-mode, motion vectors, reference (or prediction block) identity, intra-prediction pixel data, and residuals) particularly along the left column and upper most column of a large block. Thereafter, when a small block is surrounded by a sufficient number of spatial neighbor blocks and at predetermined positions, such as at least one adjacent neighbor small block to the left of the current block to be decoded and at least one adjacent neighbor small block above the current block by one example, the system then may begin analyzing the context of the neighbor blocks. The predetermined pattern of the spatial neighbor blocks may have many other variations than just the blocks directly to the left or above the current block, such as any block within some number of small blocks to the current small block, and may include corner blocks, particularly for intra coding, such as the upper left and upper right blocks at the upper corners of the current block. The indication of which context to use then is performed by the encoder and provided to the decoder, where the decoder should perform block reconstruction with the same context, here the relevant decision being whether or not to use the spatial neighbor context or not, but the encoder may actually may this determination among all possible contexts to be used including which inter-prediction mode (inter-mode) to use. This decision is placed in the overhead data or other location of the compressed bitstream which is read by the decoder to use the same context. This decision also may include which or both or neither of the exterior block context or the symbol context method is to be used as explained as follows.

Process 800 may include "determine whether context will be decoded in time to decode a current block" 806. Here the coder, coder control, or other controller for the coder, may be monitoring the processor or GPU, which may be, or be part of, a system on a chip (SoC). This includes determining whether the decoder is working on fully reconstructed context data or it is stalled and is waiting for the fully reconstructed context. To perform this, it may simply be monitoring a certain flag, tag, etc. or code (0 or 1) for example, but many other variations are possible.

The process 800 may include "determine exterior blocks to use for reconstructed context" 808. As mentioned, both encoder and decoder must decide a priory which context method to use, among all context methods, including whether or not to use the exterior block method. The method should be use the same for both encoder and decoder. So, both encoder and decoder must a priory decide which context will have a higher probability of being decoded in time. Once that has been decided, both decoder and encoder will use that context. Here, the decoder may be set to decode a current block using the exterior block method for each prediction current block that has neighbor blocks in order to form a candidate prediction among other candidates to choose from by the prediction mode selector for a block. By other forms, the exterior block method only may be used when it is needed, namely when the syntax elements are missing from the spatial neighbor blocks. The patterns that are to be used, such as closest small blocks in the adjacent large block, may be predetermined, and may be fixed no matter the type of syntax elements that are to be used to form the context. By other forms, each or individual syntax element types may have their own exterior block pattern.

As mentioned above, the exterior block pattern may be one block at the closest position in an adjacent large block and to the current small block being decoded as in image 400. As in image 500, the number of small blocks to fill the column or row of a current small block that is larger than the exterior block may be used. By other options as on image 700 (FIG. 7), more exterior blocks than will fill the row or column of the current small block may be used. When multiple exterior blocks are used, their values may be combined (such as averaged, or other algorithm). The exterior blocks may first be placed along the row or column that is on the edge of the current large block with the current small block as shown on images 400, 500, or 700. Many other variations for exterior block patterns are possible.

It is also possible that the exterior block method is not used at all and only the symbol context method is used, or both could be used together as described below.

Figure 8A:
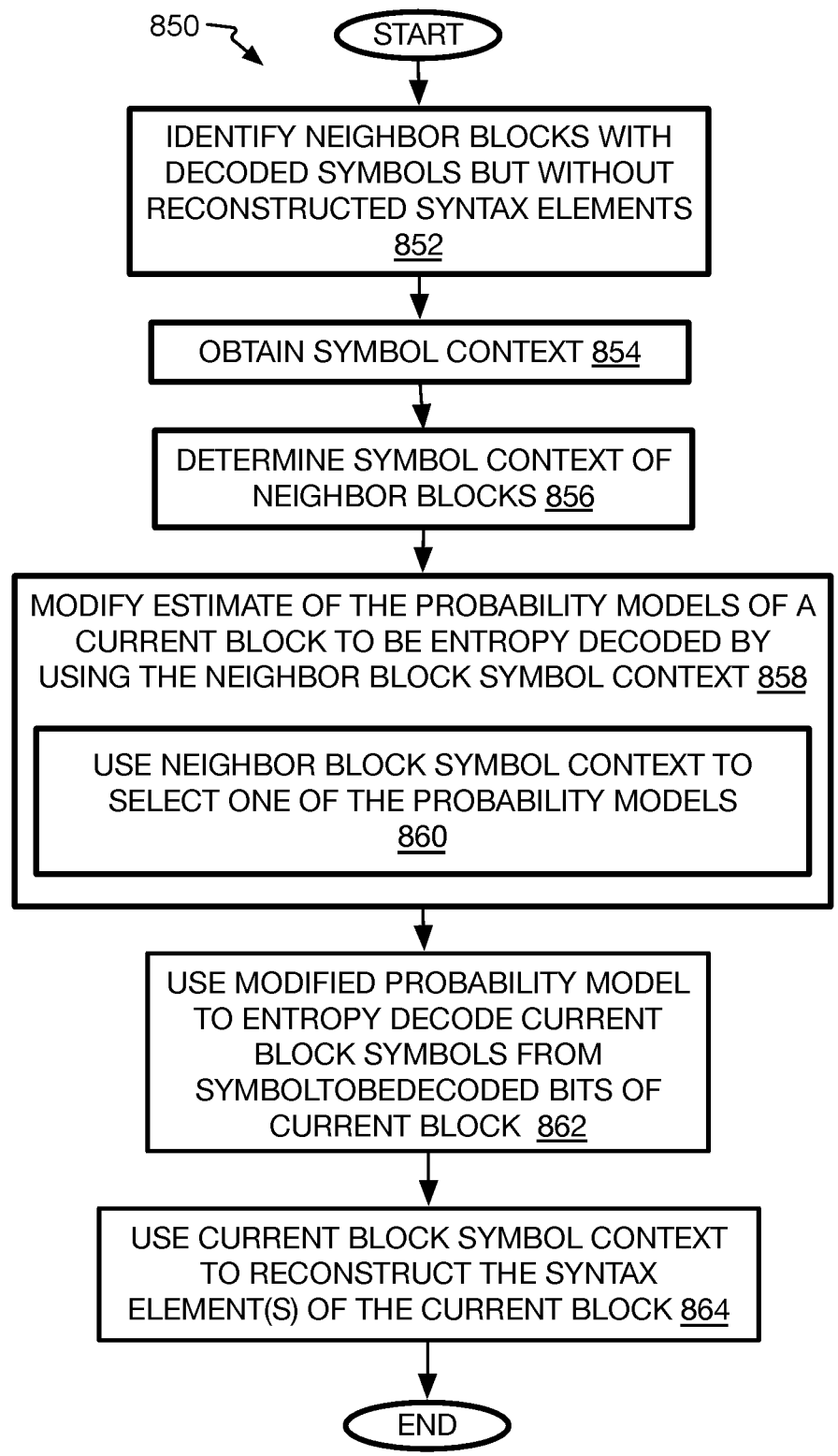
FIG. 8A is another detailed flow chart of video coding with context decoding and reconstruction bypass according to the implementations herein and using symbol context.

Alternatively or additionally, the process 800 may include "determine neighbor blocks to use and that have symbol context" 810. Here again, once it is determined that the fully constructed context of spatial neighbor blocks will not be ready for a current block to be decoded, the system may request symbols of the spatial neighbor blocks from other pipeline units according to the a priori decision of the encoder and copied to (or otherwise determined at) the decoder. The details are provided below with symbol context process 850 (FIG. 8A). The result is that it is determined whether or not the spatial neighboring blocks selected to contribute context for the current small block to be decoded at least has its symbols entropy decoded.

Process 800 may include "decode current block using context" 812. Here, whether applying the exterior block method or the symbol context method or both, the methods are applied and syntax elements are generated for the current small block. For the exterior block method, this may include combining the syntax element values into some average, such as average motion vector values including the vector x and y magnitudes and length. The location of the reference block(s) may be the same ones used on the majority of the exterior blocks. The inter-mode value may simply be the majority inter-mode value or some other probability algorithm is applied to obtain the inter-mode indicator value. Intra-prediction pixel values may be interpolated values as with residual data values from transform coefficient units.

As to the symbol context method, the details are provided on symbol context process 850, which uses previously decoded symbols of spatial neighbor blocks to select an entropy decoding probability model among a number of models. The selected model is then used to entropy decode the (or modify) the symbols to be decoded for the current small block. Once the symbols are determined for the current small block, the syntax elements can be reconstructed for the current small block. Each syntax element may have a number of its own entropy decoding probability models. The details are provided below.

It will be understood that the decoder (or encoder) may only operate one of the methods, such as only the exterior block method or the symbol context method, or may perform both methods, whether together on the same current small block or alternatively, or both. Thus, the coder may predetermine which method to apply and when. Otherwise, the coder automatically (or manually by programmer or user) may have the option to set when and how to apply the two methods. Thus, for example, one or both or neither method may be set to be used for inter-prediction versus intra-prediction versus residual reconstruction. The use of the methods could also be differentiated by inter-prediction syntax element type (inter-mode, motion vector, or reference block indicator). These may be set when it is determined one or the other method provides better quality or is more efficient. This may be preset at the manufacturer, or may be determinations by the programmer or even a user may have quality or speed settings where the methods are applied differently. Many variations exist.

One variation is to apply both methods at the same time. This could be to different syntax elements of the current small block, such as exterior block method may be used to determine the motion vector while the symbol context method is used to form the inter-mode of the current small block. Many variations of which syntax element is constructed by which method exist. By another approach, both methods could be used to reconstruct the same syntax element. Thus, when the result is a syntax element value for the current small block (say x dimension for motion vector), this value may be averaged with or otherwise combined or modified by the value from one or more exterior blocks. Here to, many variations are contemplated.

Process 800 then may include inquiry "more blocks?" 814. If yes, process 800 loops to operation 804 and repeats for the next block. If no more blocks are to use spatial probability model context for a large block or even a frame for example, then the process ends, and the coding of the current small block can be performed.

Referring now to FIG. 8A, an example process 850 is arranged in accordance with at least some implementations of the present disclosure. Process 850 may provide a computer-implemented method of video coding with context decoding and reconstruction bypass, and particularly directed to the use of symbol context in spatial neighbor blocks. In the illustrated implementation, process 850 may include one or more operations, functions or actions as illustrated by one or more of operations 852 to 862 generally numbered evenly. By way of non-limiting example, process 800 may be described herein with reference to operations discussed with respect to FIGS. 1-2 and 9 herein, and may be discussed with regard to example systems 100, 200, or 900 discussed below.

Process 850 may include "identify neighbor blocks with decoded symbols but without reconstructed syntax elements" 852. Here, with the monitoring of the pipeline as mentioned above at both the encoder and decoder, or at least the decoder, it will be revealed whether spatial neighbor blocks have already entropy decoded symbols but do not have their syntax elements reconstructed yet. By one form, the block decoding is ahead of the entropy decoding and simply wait for the symbols. Specifically, process 850 then may include "obtain symbol context" 854, and the hardware logic that is processing the context of the current small block and needs the symbols of the spatial neighbor blocks may send a request to other hardware units (other parallel pipeline units) to get the symbols (pulled), in which case it will not proceed until the symbols have been transmitted to the first processing parallel pipeline unit. In an alternative, the symbols of the neighbor blocks could be transmitted (pushed) automatically to the hardware logic that needs them, in which case there a communication protocol that may be used that will inform the hardware logic processing the current small block that the symbols of the spatial neighbor blocks have been received.

Process 850 may include "determine symbol context of neighbor blocks" 856, which simply refers to reading the symbols from memory or saving the symbols as the symbols are entropy decoded, and obtaining, by the hardware or pipeline unit that is decoding the current small block, those symbols that are directed to the syntax element that needs to be reconstructed.

Process 850 may include "modify estimate of the entropy decoding probability models of a current block to be entropy decoded by using the neighbor symbol context" 858. Here, during entropy decoding, each symbol may have multiple probability models for CABAC entropy decoding operations. Which spatial neighbor blocks were used to entropy encode the symbols is known, so that reversing the processes and decoding the symbols can be performed with the same spatial neighbor blocks to obtain the same values. The spatial neighbor block symbol context may be used to modify the probability models. This may be performed by using the symbol values of the spatial neighbor blocks to provide a probability range of values in order to select which probability model should be used to decode each bit on a codeword forming a symboltobedecoded of the current block. First some combination of the symbol values may be computed such as a norm, such as an L1 norm. The resulting value, say $e_k$ then may be compared to predetermined acceptable ranges of the symbol context value $e_k$ for each possible probability model to determine whether the symbol (not just the bit) will have a high probability of being small or large. Thus, if $e_k$ is 0 to 3, the symbol will most likely be small, and a certain probably model is used for small magnitude for this bit, and the opposite for a value over 33 where another probability model is used for large magnitude for this bit, versus in between where a third probability model is used for this bit. The range values are determined by known algorithms. This is repeated for each bit in the binary codeword forming symboltobedecoded of the current block. The probability models produce the probability of being a 0 or a 1. See, Khalid Sayood et al., Lossless Compression Handbook, Chaps. 1-2, 2003 Elsevier Inc. (2013); H.264/AVC Context Adaptive Binary Arithmetic Coding (CABC), www.vcodex.com, Vcodex Ltd (2007-2016).

To cover this operation, then, process 850 may include "use neighbor block symbol context to select one of the probability models" 860. Particularly, as just explained, the symbol context is used to select which probability model to use depending on the value of the symbol context (or norm of it) where the assumption is that the value of the symbol of the current block will be close to the symbol value of the neighbor blocks.

Process 850 then may include "use modified probability model to entropy decode current block symbols from symboltobedecoded bits of current block" 862, and here where modified refers to the selected (or selection of) a probability model for each bit. Here then, the selected probability model is applied to each bit, and the result is a binary codeword that is a symbol value of the current block. This may be repeated for each symbol of the current block that is directed to a syntax element, and then for each syntax element of the current block that needs to be decoded.

Process 850 may include "use current block symbol context to reconstruct the syntax element(s) of the current block" 864. Thereafter, the entropy decoded symbol context of the current block is now used to reconstruct the syntax element(s) of the current block such as the motion vector, and so forth, and by using the otherwise standard codecs.

While implementation of example process 300, 800, and 850, may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
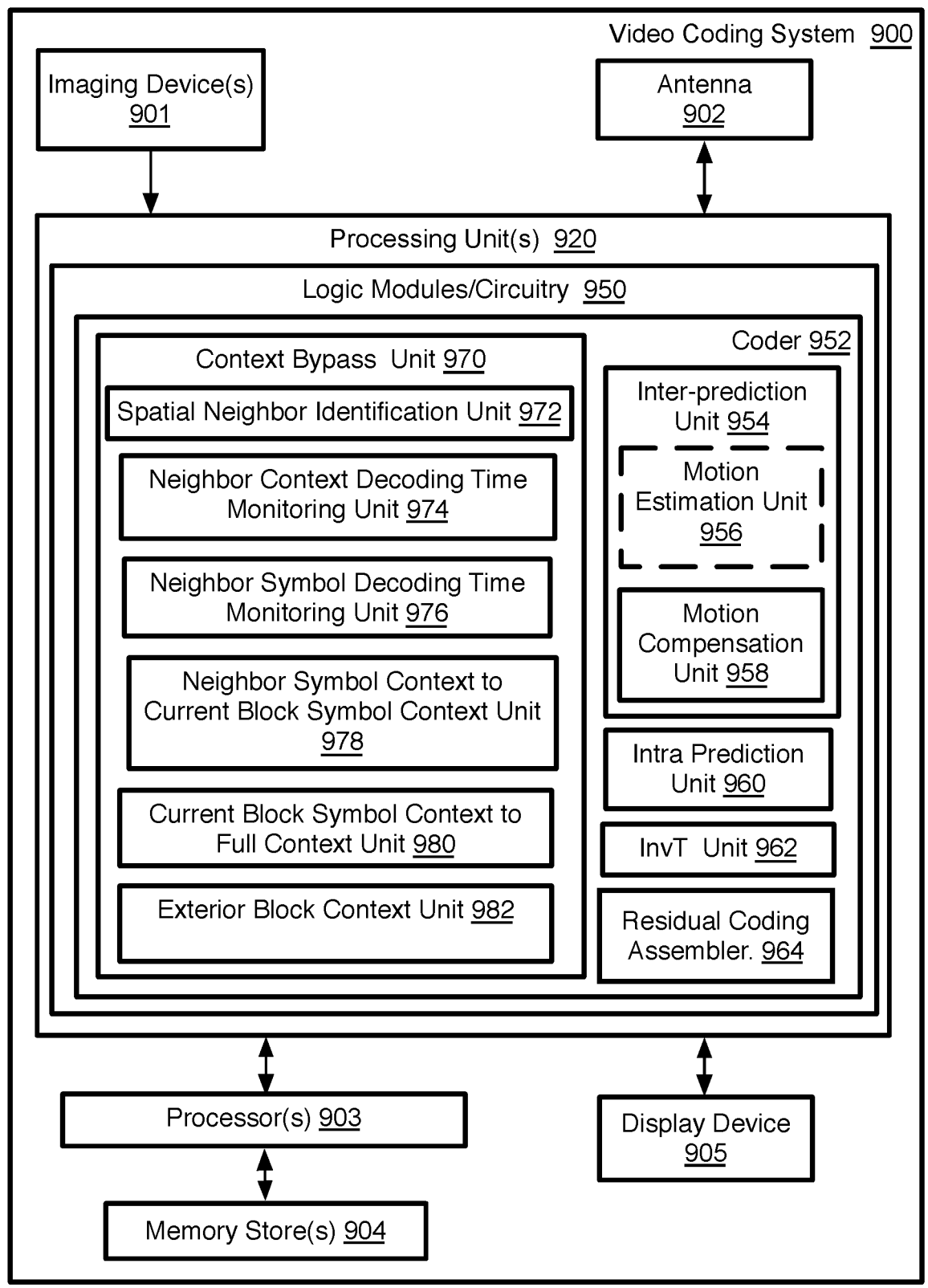
FIG. 9 is an illustrative diagram of an example system.

Referring to FIG. 9, an example image processing system (or video coding system) 900 for providing video coding with context decoding and reconstruction bypass may be arranged in accordance with at least some implementations of the present disclosure. In the illustrated implementation, system 900 may include one or more processors 903, processing unit(s) 920 to provide the encoder and decoder discussed herein, one or more imaging devices 901 to capture images, an antenna 902 to receive or transmit image data, a display device 905, and one or more memory stores 904. Processor(s) 903, memory store 904, and/or display device 905 may be capable of communication with one another, via, for example, a bus, wires, or other access. In various implementations, display device 905 may be integrated in system 900 or implemented separately from system 900.

As shown in FIG. 9, and discussed above, the processing unit(s) 920 may have logic modules 950 with a coder 952 that could be encoder 100 or 1200, or decoder 200 or 1300, or some combination of these. Relevant here, the coder 952 may have an inter-prediction unit 954 with a motion estimation unit 956 (in the encoder and optionally in the decoder) and a motion compensation unit 958. When the coder 952 is a decoder, the exterior block and symbol context bypass methods may be used to construct inter-modes, motion vectors, and/or identification of reference blocks. (This could also be applied at the encoder as mentioned above). An intra-prediction unit 960 also may be provided, and may use exterior blocks and/or partially decoded neighbor blocks to reconstruct pixels (or image or pixel data) of a current block. The coder 952 also may have an inverse transform (InvT) unit 962 and a residual coding assembler 964 that can use exterior blocks and symbol decoded neighbor blocks to reconstruct transform coefficients of a current block to reconstruct residuals.

The coder 952 also may have a context bypass unit 970, such as context bypass units 115 or 215 described above, to determine when the syntax elements of exterior blocks or symbol context of spatial neighbor blocks should be used, and which blocks, as well as other functions mentioned above. To accomplish these functions, the context bypass unit 970 may have a spatial neighbor identification unit 972 and a neighbor context decoding time monitoring unit 974. To use the symbol context from spatial neighbor blocks for decoding a current block, the context bypass unit 970 may include a neighbor symbol decoding time monitoring unit 976, a neighbor symbol context to current block symbol context unit 978, and a current block symbol context to full context unit 980. To use exterior blocks to decode a current block, the context bypass unit 970 may include an exterior block context unit 982. These units of the logic circuitry provide many of the functions described herein and as explained with the processes described above. The title of the component reveals the functions described above that are performed by that component.

As will be appreciated, the modules illustrated in FIG. 9 may include a variety of software and/or hardware modules and/or modules that may be implemented via software or hardware or combinations thereof. For example, the modules may be implemented as software via processing units 920 or the modules may be implemented via a dedicated hardware portion. Also, system 900 may be implemented in a variety of ways. For example, system 900 (excluding display device 905) may be implemented as a single chip or device having an accelerator or a graphics processor unit (GPU) which may or may not have image signal processors (ISPs), a quad-core central processing unit, and/or a memory controller input/output (I/O) module. In other examples, system 900 (again excluding display device 905) may be implemented as a chipset or a system on a chip (SoC). It will be understood antenna 902 could be used to receive image data for encoding as well.

Otherwise, processor(s) 903 may include any suitable implementation including, for example, central processing units (CPUs), microprocessor(s), multicore processors, application specific integrated circuits, chip(s), chipsets, programmable logic devices, graphics cards, integrated graphics, general purpose graphics processing unit(s), fixed function GPUs, SoCs, other accelerators, or the like. This may also include or define a pipeline that has multiple parallel pipeline units that can each process a different large block. The implementation is not limited as long as kernels used to perform video coding prediction tasks can use software, firmware, and/or hardware to run on execution units that can call fixed function hardware such as VMEs to efficiently perform repetitive computations such as for block-matching or spatial dependency calculations, or other tasks, and consistent with the description above. The VMEs may be in the form of a block in the hardware whether dedicated or not for this purpose. This may be placed in the graphics hardware, or could be a discrete GPU.

In addition, memory stores 904 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 904 also may be implemented via cache memory.

In various implementations, the example video coding system 900 may use the imaging device 901 to form or receive captured image data. This can be implemented in various ways. Thus, in one form, the image processing system 900 may be one or more digital cameras or other image capture devices, and imaging device 901, in this case, may be the camera hardware and camera sensor software, module, or component 950. In other examples, video coding system 900 may have an imaging device 901 that includes or may be one or more cameras, and logic modules 950 may communicate remotely with, or otherwise may be communicatively coupled to, the imaging device 901 for further processing of the image data.

Thus, video coding system 900 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 901 may include camera hardware and optics including one or more sensors as well as auto-focus, zoom, aperture, ND-filter, auto-exposure, flash, and actuator controls. The imaging device 901 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 901 may be provided with an eye tracking camera. Otherwise, the imaging device 901 may be any other device that records, displays or processes digital images such as video game panels or consoles, set top boxes, and so forth.

As illustrated, any of these components may be capable of communication with one another and/or communication with portions of logic modules 950 and/or imaging device 901. Thus, processors 903 may be communicatively coupled to both the image device 901 and the logic modules 950 for operating those components. Although image processing system 900, as shown in FIG. 9, may include one particular set of blocks or actions associated with particular components or modules, these blocks or actions may be associated with different components or modules than the particular component or module illustrated here.

Figure 10:
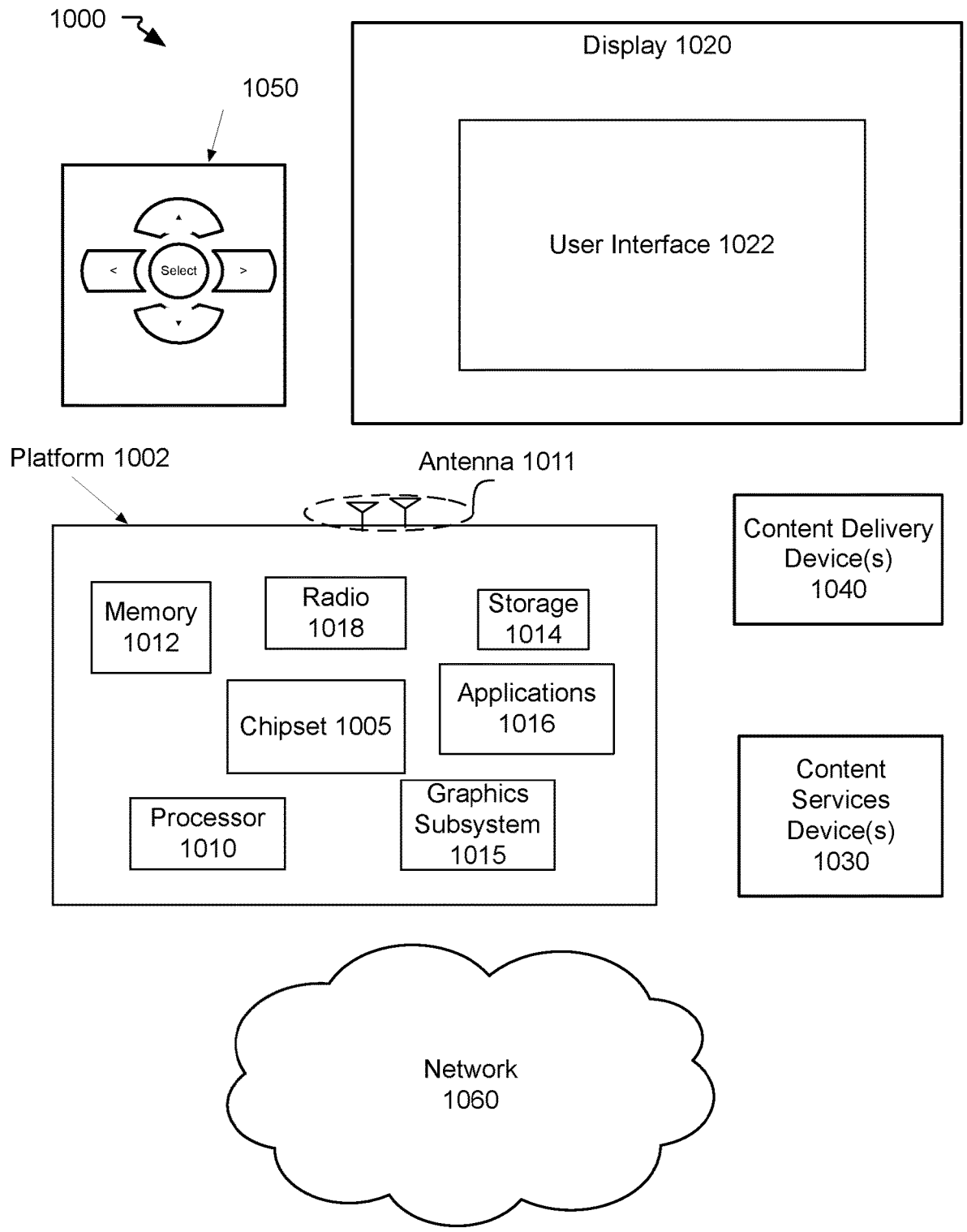
FIG. 10 is an illustrative diagram of another example system.

Referring to FIG. 10, an example system 1000 in accordance with the present disclosure and various implementations may embody system 1000 for example, and may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 communicatively coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018 as well as antenna(s) 1011. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In implementations, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
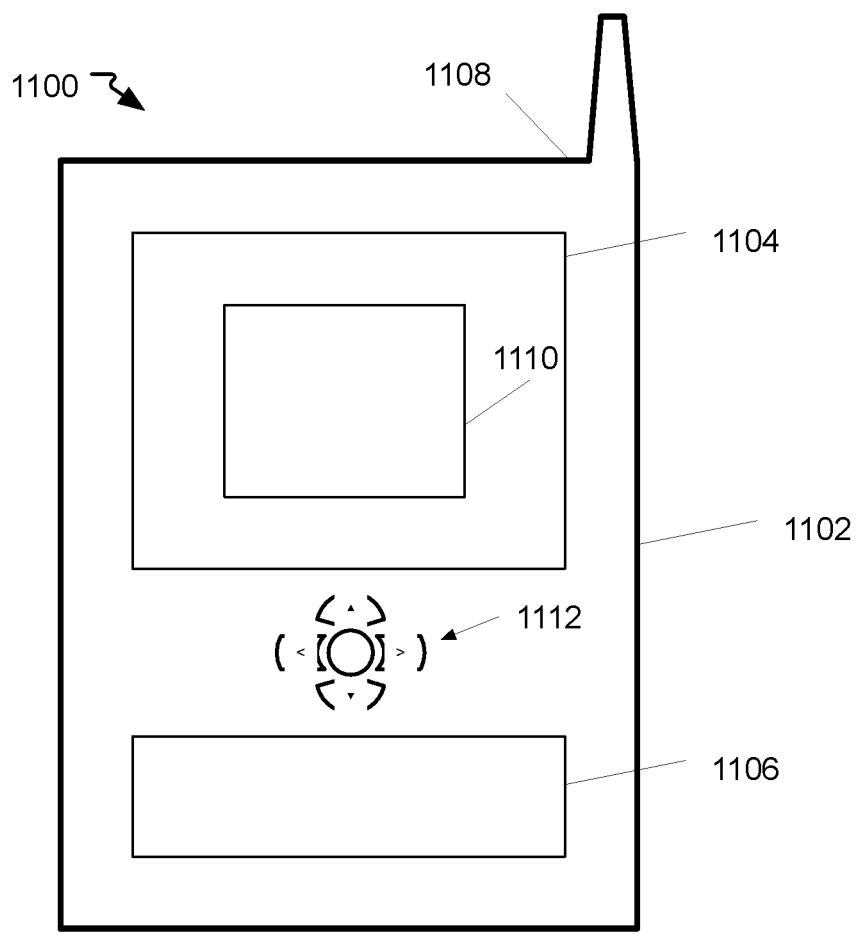
FIG. 11 illustrates another example device, all arranged in accordance with at least some implementations of the present disclosure.

As described above, system 900 or 1000 may be implemented in varying physical styles or form factors. FIG. 11 illustrates implementations of a small form factor device 1100 in which system 900 or 1000 may be implemented. In implementations, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable screen 1110 on a display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method of A computer-implemented method of video coding comprises obtaining a plurality of frames of a video sequence wherein individual frames are divided into at least one large block divided into a plurality of small blocks of pixel data and comprising a current small block; identifying at least one spatial neighbor block of the same large block as the current small block and that is to be used to decode the current block; determining whether fully constructed context to be provided by the at least one spatial neighbor block will be available when the current small block is ready to be decoded; and using already available context data of at least one context-ready block when fully constructed context of the at least one spatial neighbor block is not available to decode the current small block.

By another implementation, the method may include that wherein the at least one context-ready ready block is disposed exterior to the large block of the current small block; wherein the at least one context-ready block is disposed in a large block adjacent the large block of the current small block; wherein the at least one context-ready block is disposed in a small block row or small block column adjacent and extending along an edge of the large block of the current small block; and the method comprising multiple exterior context-ready blocks having context data that is combined to form context values to be used to decode the current small block, wherein the at least one context-ready block is disposed in a large block adjacent the large block of the current small block and in at least one same row or column of the current small block; wherein the current small block and the at least one context-ready block are not the same size; wherein the fully constructed context comprises: at least one inter-prediction mode identification of multiple available inter-prediction modes, at least one motion vector, at least one identification of a reference block, at least one pixel data value for intra-prediction, or at least one transform coefficient to be used to form a residual. The method also comprising determining whether the at least one spacial neighbor block comprises available context data comprising decoded symbols that are not yet constructed to fully constructed context; and using the symbols to determine symbols of the current small block to be used to construct fully constructed context of the current small block. The method also may be comprising: determining symbol context of the at least one spatial neighbor block; selecting an entropy decoding probability model of a plurality of probability models of the symbols of the current small block and depending on the symbol context; using the selected probability model to construct symbols of the current small block; and using the selected probability model to construct fully constructed context of the current small block; wherein the current small block is being reconstructed as at least one of an inter-prediction block, an intra-prediction block, and a transform block; and the method comprising providing the option, by a coder, to decode current small blocks using the already available context data of at least one context-ready block when fully constructed context of the at least one spatial neighbor block is not available and provides the option to provide for any one, two or all three of the inter-prediction blocks, the intra-prediction blocks, and/or the transform blocks; and providing the option, by a coder, to obtain already available context data from: (1) exterior context-ready blocks or (2) the at least one spatial neighbor block having symbol context data not yet formed into fully constructed context, or both (1) and (2); wherein the exterior context-ready blocks and the at least one spacial neighbor block each contribute to a different syntax element of the fully constructed context of the current small block.

By yet another implementation, a computer-implemented system comprises a memory; a display communicatively connected to the memory; at least one processor communicatively coupled to the display and the memory; and a context bypass unit to be operated by the at least one processor and to operate by: obtaining a plurality of frames of a video sequence wherein individual frames are divided into at least one large block divided into a plurality of small blocks of pixel data and comprising a current small block; identifying at least one spatial neighbor block of the same large block as the current small block and that is to be used to decode the current block; determining whether full reconstructed context to be provided by the at least one spatial neighbor block will be decoded when the current small block is ready to be decoded; and using already available decoded context data of at least one context-ready block when full reconstructed context data of the at least one spatial neighbor block is not available to decode the current small block.

By another example, the system includes wherein the at least one context-ready block is disposed exterior to the large block of the current small block; the system comprising multiple context-ready blocks disposed at an exterior of the large block having the current small block, wherein the context bypass unit operating by combining the values of the multiple context-ready blocks to provide the fully constructed context for the current small block; wherein the at least one context-ready block is disposed in a small block row or small block column adjacent and extending along an edge of the large block of the current small block; wherein the at least one context-ready block being the at least one spacial neighbor block having available context data comprising entropy decoded symbols that are not yet constructed to fully constructed context having syntax elements; wherein the context bypass unit is to operate by: determining symbol context of the at least one spatial neighbor block; selecting an entropy decoding probability model of a plurality of probability models of the symbols of the current small block and depending on the symbol context; using the selected probability model to construct symbols of the current small block; and using the selected probability model to construct fully constructed context of the current small block. The system also includes wherein the context bypass unit is to operate by obtaining already available context data from both: (1) at least one context-ready block that is exterior to the large block with the current small block and having fully constructed context, and (2) at least one context-ready block that is the at least one spatial neighbor block and having symbol context data not yet formed into fully constructed context, and using both context-ready blocks to decode syntax elements of the current small block. The system may comprise a decoding pipeline having parallel pipeline units each with a processing granularity of one of the large blocks; wherein the fully constructed context comprises at least one of: identification of at least one inter-prediction mode of multiple available inter-prediction modes, at least one motion vector, at least one identification of a reference block, at least one pixel data value for intra-prediction, or at least one transform coefficient to be used to form a residual.

By one approach, at least one computer readable article comprises a plurality of instructions that in response to being executed on a computing device, cause the computing device to operate by: obtaining a plurality of frames of a video sequence wherein individual frames are divided into at least one large block divided into a plurality of small blocks of pixel data and comprising a current small block; identifying at least one spatial neighbor block of the same large block as the current small block and that is to be used to decode the current block; determining whether full reconstructed context to be provided by the at least one spatial neighbor block will be decoded when the current small block is ready to be decoded; and using already available decoded context data of at least one context-ready block when full reconstructed context data of the at least one spatial neighbor block is not available to decode the current small block.

By another approach, the instructions include that at least one of: the at least one context-ready block being disposed exterior to the large block of the current small block and has fully constructed context forming at least one type of syntax element, and the at least one context-ready block being the at least one spacial neighbor block having available context data comprising entropy decoded symbols that are not yet constructed to fully constructed context having syntax elements.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of video coding comprising:
   obtaining a plurality of frames of a video sequence wherein individual frames are divided into large blocks each divided into a plurality of small blocks of pixel data and comprising a current small block in a current large block;

identifying at least one spatial neighbor block of the current large block and that is to be used to decode the current small block;
determining whether the at least one spatial neighbor block comprises available context data comprising decoded symbols that are not yet constructed to fully constructed context; and
using the symbols to determine symbols of the current small block to be used to construct fully constructed context of the current small block comprising:
determining symbol context of the at least one spatial neighbor block,
selecting an entropy decoding probability model of a plurality of probability models of the symbols of the current small block and depending on the symbol context, and
using the selected probability model to construct symbols and fully constructed context of the current small block.

2. The method of claim 1 wherein data of large blocks are coded large block by large block, and wherein small blocks of the current large block are arranged in columns or rows aligning with rows or columns of small blocks in one or more adjacent large blocks adjacent the current large block; the method comprising:
determining whether fully constructed context to be provided by the at least one spatial neighbor block will be available when the current small block is ready to be decoded;
predetermining a location of at least one context-ready block relative to a location of the current small block in case the at least one context-ready block is needed to decode the current small block and without performing a search to match any part or all of the at least one context-ready block to the current small block; and
using already available context data of the at least one context-ready block when fully constructed context of the at least one spatial neighbor block is not available to decode the current small block, wherein the at least one context-ready block is disposed external to the current large block and in a row or column of a large adjacent block adjacent the current large block, wherein the row or column of the large adjacent block shares an edge of the current large block.

3. The method of claim 2 comprising providing multiple exterior context-ready blocks having context data that is combined to form context values to be used to decode the current small block and in the same row or column of the large adjacent block.

4. The method of claim 2 wherein the at least one context-ready block disposed in the large adjacent block adjacent the large block of the current small block is disposed in at least one same row or column of the current small block.

5. The method of claim 2 wherein the current small block and the at least one context-ready block are not the same size.

6. The method of claim 2 comprising providing the option, by a coder, to decode current small blocks using the already available context data of at least one context-ready block when fully constructed context of the at least one spatial neighbor block is not available and provides the option to provide for any one, two or all three of inter-prediction blocks, intra-prediction blocks, and/or transform blocks.

7. The method of claim 2 comprising providing the option, by a coder, to obtain already available context data from: (1) exterior context-ready blocks or (2) the at least one spatial neighbor block having symbol context data not yet formed into fully constructed context, or both (1) and (2).

8. The method of claim 2 wherein the exterior context-ready blocks and the at least one spatial neighbor block each contribute to a different syntax element of the fully constructed context of the current small block.

9. The method of claim 8 wherein the exterior context-ready blocks indicate a motion vector and the at least one spatial neighbor block indicates a prediction mode.

10. The method of claim 2 wherein the at least one context-ready block indicates at least one motion vector and the decoded symbols indicate a prediction mode of the at least one spatial neighbor block.

11. The method of claim 2 wherein the current and adjacent large blocks have 64 of the small blocks arranged in rows and columns of 8×8.

12. The method of claim 2 wherein the size of the small blocks in the large adjacent block is not the same as the size of the small block in the current large block, and wherein a number of multiple small blocks in the row or column of the large adjacent block sufficient to equal a width or height of the current block is used to code the current block.

13. The method of claim 1 wherein the fully constructed context comprises:
at least one inter-prediction mode identification of multiple available inter-prediction modes,
at least one motion vector,
at least one identification of a reference block,
at least one pixel data value for intra-prediction, or
at least one transform coefficient to be used to form a residual.

14. The method of claim 1 wherein the current small block is being reconstructed as at least one of an inter-prediction block, an intra-prediction block, and a transform block.

15. A computer implemented system comprising:
a memory;
a display communicatively connected to the memory; and
at least one processor communicatively coupled to the display and the memory, the at least one processor being arranged to operate by;
obtaining a plurality of frames of a video sequence wherein individual frames are divided into large blocks each divided into a plurality of small blocks of pixel data and comprising a current small block in a current large block,
identifying at least one spatial neighbor block of the current large block and that is to be used to decode the current block, wherein the at least one spatial neighbor block having available context data comprising entropy decoded symbols that are not yet constructed to fully constructed context having syntax elements;
determining symbol context of the at least one spatial neighbor block;
selecting an entropy decoding probability model of a plurality of probability models of the symbols of the current small block and depending on the symbol context;
using the selected probability model to construct symbols and fully constructed context of the current small block.

16. The system of claim 15, wherein data of large blocks are coded large block by large block, and wherein small blocks of the current large block are arranged in columns or rows aligning with rows or columns of small blocks in one or more adjacent large blocks adjacent the current large block, and wherein the at least one processor being arranged to operate by:

determining whether fully constructed context to be provided by the at least one spatial neighbor block will be available when the current small block is ready to be decoded;

predetermining a location of at least one context-ready block relative to a location of the current small block in case the at least one context-ready block is needed to decode the current small block and without performing a search to match any part or all of the at least one context-ready block to the current small block; and using already available context data of the at least one context-ready block when fully constructed context of the at least one spatial neighbor block is not available to decode the current small block, wherein the at least one context-ready block is disposed external to the current large block and in a row or column of a large adjacent block adjacent the current large block, wherein the row or column of the large adjacent block shares an edge of the current large block.

17. The system of claim 16 comprising multiple context-ready blocks disposed at an exterior of the large block having the current small block and in the same row or column of the large adjacent block, wherein the at least one processor to operate by combining the values of the multiple context-ready blocks to provide the fully constructed context for the current small block.

18. The system of claim 16 wherein the at least one processor is to operate by obtaining already available context data from both: (1) at least one context-ready block that is exterior to the large block with the current small block and having fully constructed context, and (2) at least one context-ready block that is the at least one spatial neighbor block and having symbol context data not yet formed into fully constructed context, and using both context-ready blocks to decode syntax elements of the current small block.

19. The system of claim 18 wherein the at least one context-ready block with the fully constructed context has fully constructed context indicating a motion vector, and the at least one context-ready block that is the at least one spatial neighbor block has symbol context indicating a prediction mode of the at least one spatial neighbor block.

20. The system of claim 16 wherein the size of the small blocks in the large adjacent block is not the same as the size of the small block in the current large block, and wherein a number of multiple small blocks in the row or column of the large adjacent block sufficient to equal a width or height of the current block is used to code the current block.

21. The system of claim 15 wherein the fully constructed context comprises at least one of:
identification of at least one inter-prediction mode of multiple available inter-prediction modes,
at least one motion vector,
at least one identification of a reference block,
at least one pixel data value for intra-prediction, or
at least one transform coefficient to be used to form a residual.

22. At least one non-transitory computer readable article comprising a plurality of instructions that in response to being executed on a computing device, cause the computing device to operate by:
obtaining a plurality of frames of a video sequence wherein individual frames are divided into large blocks each divided into a plurality of small blocks of pixel data and comprising a current small block in a current large block;

identifying at least one spatial neighbor block of the current large block and that is to be used to decode the current block, wherein the at least one spatial neighbor block having available context data comprising entropy decoded symbols that are not yet constructed to fully constructed context having syntax elements;

selecting an entropy decoding probability model of a plurality of probability models of the symbols of the current small block and depending on symbol context of the at least one spatial neighbor block; and using the selected probability model to construct symbols and fully constructed context of the current small block.

23. The article of claim 22 wherein data of large blocks are coded large block by large block, and wherein small blocks of the current large block are arranged in columns or rows aligning with rows or columns of small blocks in one or more adjacent large blocks adjacent the current large block, and wherein the instructions cause the computing device to operate by:

determining whether fully constructed context to be provided by the at least one spatial neighbor block will be available when the current small block is ready to be decoded;

predetermining a location of at least one context-ready block relative to a location of the current small block in case the at least one context-ready block is needed to decode the current small block and without performing a search to match any part or all of the at least one context-ready block to the current small block; and using already available context data of the at least one context-ready block when fully constructed context of the at least one spatial neighbor block is not available to decode the current small block, wherein the at least one context-ready block is disposed external to the current large block and in a row or column of a large adjacent block adjacent the current large block, wherein the row or column of the large adjacent block shares an edge of the current large block.

24. A computer-implemented method of video coding comprising:
obtaining a plurality of frames of a video sequence wherein individual frames are divided into large blocks each divided into a plurality of small blocks of pixel data and comprising a current small block in a current large block identifying at least one spatial neighbor block of the current large block; and when fully constructed context is not available from the at least one spatial neighbor block, providing an option to decode the current small block by:
(1) using available context data of the at least one spatial neighbor block comprising:
selecting an entropy decoding probability model of a plurality of probability models of the symbols of the current small block and depending on the symbol context of the at least one spatial neighbor block, and
using the selected probability model to construct symbols and fully constructed context of the current small block;
or
(2) using already available context data of at least one context-ready block, wherein the at least one context-ready block is disposed external to the current large block and in a row or column of a large adjacent block adjacent the current large block, wherein the row or column of the large adjacent block shares an edge of the current large block, and wherein a location of the at least one context-ready block relative to a location of the current small block is predetermined without performing a search to match any part or all of the at least one context-ready block to the current small block; or both (1) and (2).

* * * * *